US010756832B2

(12) United States Patent
Kobayashi et al.

(10) Patent No.: US 10,756,832 B2
(45) Date of Patent: Aug. 25, 2020

(54) WIRELESS QUALITY PREDICTION DEVICE, WIRELESS BASE STATION, WIRELESS TERMINAL, WIRELESS QUALITY PREDICTION METHOD AND WIRELESS QUALITY PREDICTION PROGRAM

(71) Applicant: NEC CORPORATION, Tokyo (JP)

(72) Inventors: Kosei Kobayashi, Tokyo (JP); Takahiro Nobukiyo, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 228 days.

(21) Appl. No.: 16/070,417

(22) PCT Filed: Jan. 26, 2017

(86) PCT No.: PCT/JP2017/002766
§ 371 (c)(1),
(2) Date: Jul. 16, 2018

(87) PCT Pub. No.: WO2017/135152
PCT Pub. Date: Aug. 10, 2017

(65) Prior Publication Data
US 2019/0044633 A1 Feb. 7, 2019

(30) Foreign Application Priority Data

Feb. 1, 2016 (JP) .................. 2016-017321

(51) Int. Cl.
*H04B 17/373* (2015.01)
*H04W 16/18* (2009.01)
(Continued)

(52) U.S. Cl.
CPC ......... *H04B 17/373* (2015.01); *H04B 17/309* (2015.01); *H04B 17/3913* (2015.01);
(Continued)

(58) Field of Classification Search
CPC combination set(s) only.
See application file for complete search history.

(56) References Cited

U.S. PATENT DOCUMENTS

| 2003/0156540 A1* | 8/2003 | Trossen | ................ H04L 12/185 370/232 |
| 2014/0128115 A1* | 5/2014 | Siomina | ................ H04W 24/10 455/501 |

(Continued)

FOREIGN PATENT DOCUMENTS

| JP | 9-219697 A | 8/1997 |
| JP | 2005-191938 A | 7/2005 |

(Continued)

OTHER PUBLICATIONS

Karoly Farkas, et al., "Pattern Matching Based Link Quality Prediction in Wireless Mobile Ad Hoc Networks", Proceedings of the 9th ACM International Symposium on Modeling Analysis and Simulation of Wireless and Mobile Systems, 2006, 12 pages.

(Continued)

*Primary Examiner* — Hassan Kizou
*Assistant Examiner* — Abdullahi Ahmed
(74) *Attorney, Agent, or Firm* — Sughrue Mion, PLLC

(57) ABSTRACT

In the present invention, in order to predict discontinuous wireless quality changes without using wireless terminal position information in a cellular type wireless communication system, a wireless quality prediction device is provided with: a measurement information acquisition means for acquiring wireless quality measurement information measured by a wireless terminal that moves within a wireless communication system having at least two wireless cells; a wireless quality transition pattern construction means for using the measurement information to construct, as a wireless quality transition pattern, a time-series data pattern of wireless quality associated with the passage of (Continued)

time; and a wireless quality prediction means for acquiring from the wireless quality transition pattern construction means a wireless quality transition pattern having a high degree of similarity to the measurement information, in regards to the wireless quality measurement information acquired from a wireless terminal for which a prediction is to be made, and for using the acquired wireless quality transition pattern to predict that future wireless quality in respect to the wireless terminal for which a prediction is to be made, or a wireless cell in which the wireless terminal for which a prediction is to be made is located, will change in the future.

20 Claims, 24 Drawing Sheets

(51) Int. Cl.
*H04W 36/00* (2009.01)
*H04W 36/30* (2009.01)
*H04B 17/309* (2015.01)
*H04B 17/391* (2015.01)

(52) U.S. Cl.
CPC ....... *H04W 16/18* (2013.01); *H04W 36/0083* (2013.01); *H04W 36/30* (2013.01); *H04W 36/0058* (2018.08)

(56) References Cited

U.S. PATENT DOCUMENTS

2016/0150549 A1\* 5/2016 Kim .................... H04W 72/085
370/329
2016/0359719 A1\* 12/2016 Travostino .............. H04L 41/16

FOREIGN PATENT DOCUMENTS

| JP | 2006-067507 A | 3/2006 |
| JP | 2007-251840 A | 9/2007 |
| JP | 2008-306277 A | 12/2008 |

OTHER PUBLICATIONS

International Search Report for PCT/JP2017/002766 dated Apr. 25, 2017 [PCT/ISA/210].
Written Opinion for PCT/JP2017/002766 dated Apr. 25, 2017 [PCT/ISA/237].

\* cited by examiner

Fig.11

| | B-1 (WIRELESS CELL B) | B-2 (WIRELESS CELL B) | B-3 (WIRELESS CELL B) |
|---|---|---|---|
| A-1 (WIRELESS CELL A) | 0.0 | 0.7 | 0.3 |
| A-2 (WIRELESS CELL A) | 1.0 | 0.0 | 0.0 |

WIRELESS QUALITY PREDICTION DEVICE, WIRELESS BASE STATION, WIRELESS TERMINAL, WIRELESS QUALITY PREDICTION METHOD AND WIRELESS QUALITY PREDICTION PROGRAM

CROSS REFERENCE TO RELATED APPLICATIONS

This application is a National Stage of International Application No. PCT/JP2017/002766, filed on Jan. 26, 2017, which claims priority from Japanese Patent Application No. 2016-017321, filed on Feb. 1, 2016, the disclosure of which is incorporated herein in its entirety by reference.

TECHNICAL FIELD

The present invention relates to a wireless quality prediction device, a wireless base station, a wireless terminal, a wireless quality prediction method, and a wireless quality prediction program, and particularly relates to a wireless quality prediction device, a wireless base station, a wireless terminal, a wireless quality prediction method, and a wireless quality prediction program in a cellular type wireless communication system.

BACKGROUND ART

In a cellular type wireless communication system represented by a mobile telephone network, a plurality of wireless base stations that are arranged in a distributed manner constitute a wide service area. Each wireless base station forms a wireless cell that is a range where communication with the wireless base station can be performed and establishes wireless links with wireless terminals belonging to the wireless cell. Each wireless terminal connects to an upper level network, such as the Internet network, via a wireless base station and performs data communication with various types of server devices. Note that, in general, approximately one to six wireless cells are managed by each wireless base station.

In a cellular type wireless communication system, it is further possible to, using a handover (HO) function, switch wireless cells, to one of which a wireless terminal belongs. The handover function enables a wireless terminal to appropriately switch a wireless cell to which the wireless terminal belongs to a proper wireless cell even while the wireless terminal is moving and to continue data communication.

In a wireless communication system, due to influence of temporal or spatial bias in occurring traffic, complicated propagation characteristics of radio waves, movement of users, or the like, variation is likely to occur in the quality of a wireless link (hereinafter, simply referred to as wireless quality) between a wireless terminal and a wireless base station. As an example, when a movement of a wireless terminal causes a propagation environment of radio waves between the wireless terminal and a wireless base station to change from a state of having no obstacle therebetween (a line-of-sight (LOS) state) to a state of having an obstacle therebetween (a non-line-of-sight (NLOS) state), the wireless quality is highly likely to change extremely before and after the change in the propagation environment.

A rapid change in wireless quality becomes a cause of deterioration or a factor in denying an improvement in the quality of end-to-end communication between a wireless terminal and a server device. For example, when communication is performed using a Transmission Control Protocol (TCP), which is a representative communication protocol used in Internet networks, incapability of transmission rate control using TCP in efficiently following a rapid change in wireless quality may cause network congestion. In addition, a rapid change in wireless quality may also cause an issue in that a communication band in a communication section between a wireless base station and a wireless terminal (hereinafter, referred to as a wireless section) is not fully used.

In order to solve such issues, technologies for predicting wireless quality of a wireless terminal have been proposed.

A Patent Literature 1 (PTL1) discloses a technology of calculating a regression equation from time-series data of latest wireless environment values and, using the regression equation, calculating predicted values of wireless environment values. According to a method disclosed in PTL1, for a regression equation for obtaining predicted values of wireless environment values, for example, an Auto-regressive (AR) model is used.

A Patent Literature 2 (PTL2) discloses a technology of, based on present positional information and pre-registered radio strength distribution information, predicting radio strength in future communication. According to a method disclosed in PTL2, radio strength is predicted by downloading data indicating radio strength conditions concerning a train line that a user is to use into a mobile information terminal in advance and predicting a position that the terminal reaches.

A Patent Literature 3 (PTL3) discloses a technology of predicting a transition of a mobile terminal device to an incommunicable state by determining whether or not a latest position of the mobile terminal device and a time fall into a positional range and a period of time, respectively, defined by customary condition information. According to a method disclosed in PTL3, positional information and temporal information are stored every time a mobile terminal device is brought to an incommunicable out-of-service state. In addition, conditions resembling conditions estimated to reappear among past conditions causing occurrence of the out-of-service state are set as the customary condition information.

A Non-Patent Literature 1 (NPL1) discloses a technology of predicting a future value of a Signal-to-Noise Ratio (SNR) between nodes in an ad hoc network. According to a method disclosed in NPL1, first, changes of past SNRs are stored as training data. When an SNR is predicted, a pattern having a high degree of similarity to a latest change pattern of SNRs is specified out of past change patterns of SNRs included in the training data. After that, a future SNR value is predicted using the specified change pattern of SNRs.

CITATION LIST

Patent Literature

[PTL1] Japanese Laid-Open Patent No. 2008-306277
[PTL2] Japanese Laid-Open Patent No. 2006-067507
[PTL3] Japanese Laid-Open Patent No. 2007-251840

Non Patent Literature

[NPL1] Farkas, Karoly, et al. "Pattern matching based link quality prediction in wireless mobile ad hoc networks." Proceedings of the 9th ACM international symposium on Modeling analysis and simulation of wireless and mobile systems. ACM, 2006.

SUMMARY OF INVENTION

Technical Problem

In the technology of predicting a future wireless quality using a regression equation or the like based on a latest wireless quality change (for example, PTL1), it is difficult to predict a discontinuous change in wireless quality. That is, since a technology like PTL1 predicts future wireless quality, based on a latest wireless quality change, prediction with high accuracy cannot be performed when a latest wireless quality tendency and a future wireless quality tendency do not have a continuity. For example, when a radio propagation environment between a wireless terminal and a wireless base station changes suddenly due to influence of an obstacle or the like, a wireless terminal is handed over to another wireless base station, or the like, a latest wireless quality tendency and a future wireless quality tendency do not have a continuity, which is likely to cause a discontinuous change in wireless quality.

In the technology of predicting wireless quality using positional information (for example, PTL2 or PTL3), it is difficult to predict wireless quality when geographical position information of a wireless terminal cannot be obtained. In the above description, the case where geographical position information of a wireless terminal cannot be obtained means, for example, a case where the wireless terminal does not support measurement of position using a Global Navigation Satellite System such as a Global Positioning System (GPS). Even when a wireless terminal supports such the measurement of position using a Global Navigation Satellite System, the case includes a case where obtaining positional information is difficult due to a problem of privacy, a problem of power consumption or the like, and the like.

In the technology of, using past change patterns of wireless quality between specific nodes, predicting future wireless quality between the specific nodes (for example, NPL1), it is difficult to predict a discontinuous change in wireless quality in a cellular type wireless communication system. This is because a change in a wireless cell to which a wireless terminal belongs cannot be predicted.

That is, as described above, the related technologies have an issue in predicting a discontinuous change in wireless quality without using positional information of a wireless terminal in a cellular type wireless communication system.

The present invention has been made in consideration of the above-described issue. An object of the present invention is to provide a wireless quality prediction device, a wireless base station, a wireless terminal, a wireless quality prediction method, and a wireless quality prediction program that contribute to predicting a discontinuous change in wireless quality without using positional information of a wireless terminal in a cellular type wireless communication system.

Solution to Problem

In order to achieve the above-described object, a wireless quality prediction device that is one embodiment of the present invention includes: a measurement information acquisition means for acquiring measurement information of wireless quality measured by a wireless terminal that moves within a wireless communication system having two or more wireless cells; a wireless quality change pattern construction means for, by use of the measurement information of wireless quality, constructing, as a wireless quality change pattern, a time-series data pattern of wireless quality associated with passage of time; and a wireless quality prediction means for, with respect to measurement information of wireless quality acquired from a prediction target wireless terminal, acquiring the wireless quality change pattern having a high degree of similarity to the measurement information from the wireless quality change pattern construction means and, by use of the acquired wireless quality change pattern, predicting future wireless quality of the prediction target wireless terminal or a future change in a wireless cell to which the prediction target wireless terminal belongs.

In addition, a wireless quality prediction method that is another embodiment of the present invention includes: acquiring measurement information of wireless quality measured by a wireless terminal that moves within a wireless communication system having two or more wireless cells; by use of the measurement information of wireless quality, constructing, as a wireless quality change pattern, a time-series data pattern of wireless quality associated with passage of time; with respect to measurement information of wireless quality acquired from a prediction target wireless terminal, acquiring the wireless quality change pattern having a high degree of similarity to the measurement information; and, by use of the acquired wireless quality change pattern, predicting future wireless quality of the prediction target wireless terminal or a future change in a wireless cell to which the prediction target wireless terminal belongs.

Further, a wireless quality prediction program that is still another embodiment of the present invention makes a computer function as: a measurement information acquisition function means for acquiring measurement information of wireless quality measured by a wireless terminal that moves within a wireless communication system having two or more wireless cells; a wireless quality change pattern construction function means for, by use of the measurement information of wireless quality, constructing, as a wireless quality change pattern, a time-series data pattern of wireless quality associated with passage of time; and a wireless quality prediction function means for, with respect to measurement information of wireless quality acquired from a prediction target wireless terminal, acquiring the wireless quality change pattern having a high degree of similarity to the measurement information from the wireless quality change pattern construction function means and, by use of the acquired wireless quality change pattern, predicting future wireless quality of the prediction target wireless terminal or a future change in a wireless cell to which the prediction target wireless terminal belongs.

In addition, a wireless base station that is still another embodiment of the present invention includes: the above-described wireless quality prediction device; and a terminal measurement control means for instructing a wireless terminal to measure and report wireless quality, acquiring measurement information of wireless quality measured by the wireless terminal, and outputting the measurement information of wireless quality to the wireless quality prediction device.

Further, a wireless terminal that is still another embodiment of the present invention includes the above-described wireless quality prediction device.

Advantageous Effects of Invention

The present invention may contribute to predicting a discontinuous change in wireless quality without using positional information of a wireless terminal in a cellular type wireless communication system.

BRIEF DESCRIPTION OF DRAWINGS

FIG. 11 is a diagram illustrating an example of transition information.

DESCRIPTION OF EMBODIMENTS

Figure 1:
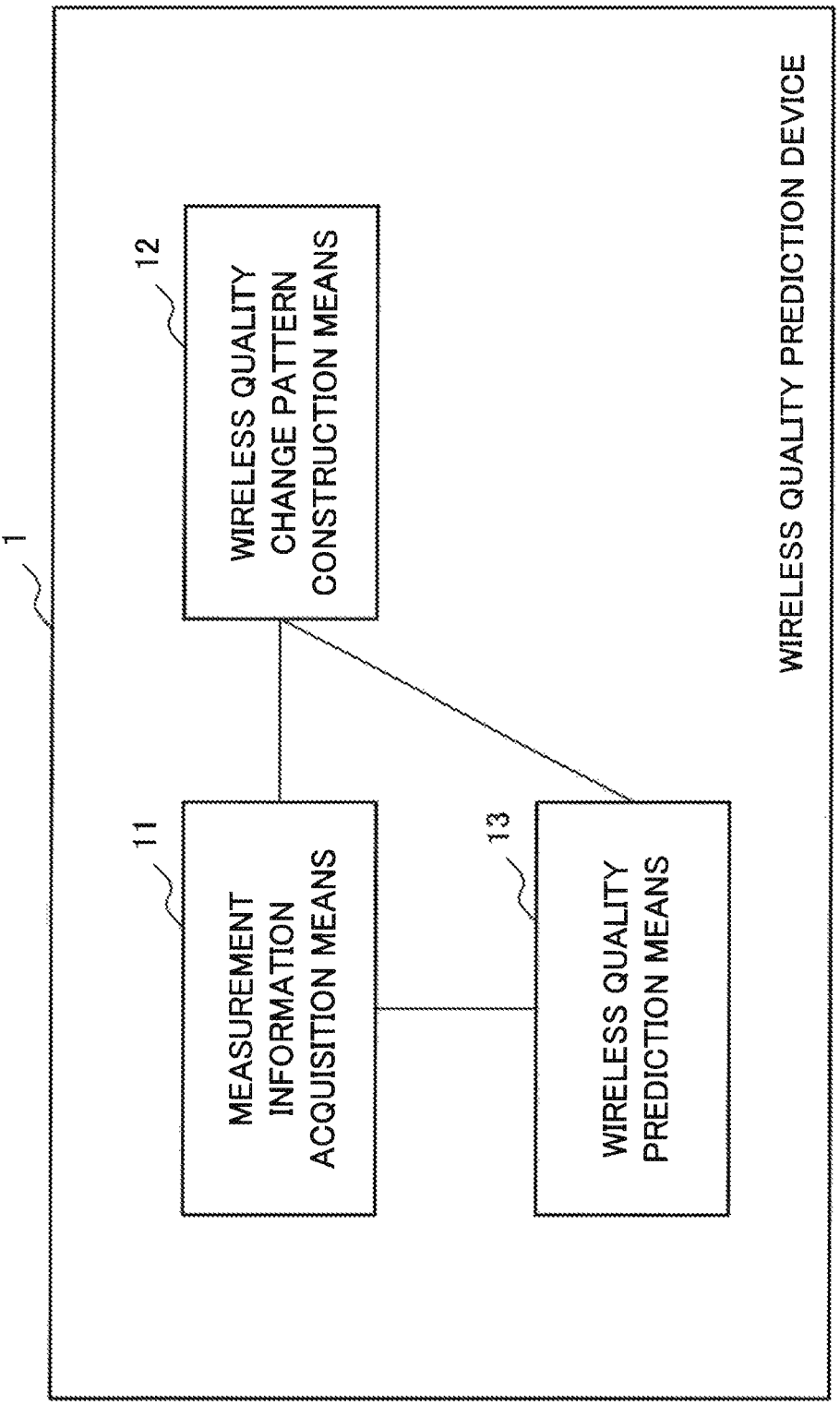
FIG. 1 is a block diagram exemplifying a configuration of a wireless quality prediction device according to a first example embodiment of the present invention.

Example embodiments for embodying the present invention will be described in detail below with reference to the drawings.

Note that the example embodiments are exemplifications, and devices, methods and the like disclosed herein are not limited to configurations in the following example embodiments. In addition, reference symbols assigned in the drawings are given for convenience sake as an example for assisting understanding and are not intended to suggest any limitation. Further, in the respective drawings, the same reference symbols are assigned to components having the same functions, and overlapping descriptions thereof will be appropriately omitted.

First Example Embodiment

With reference to FIGS. 1 to 6, a first example embodiment will be described.

FIG. 1 is a block diagram exemplifying a configuration of a wireless quality prediction device according to the first example embodiment of the present invention.

A wireless quality prediction device 1 according to the first example embodiment is configured including a measurement information acquisition means 11, a wireless quality change pattern construction means 12, and a wireless quality prediction means 13.

The measurement information acquisition means 11 acquires measurement information of wireless quality measured by a wireless terminal that moves within a wireless communication system having two or more wireless cells.

The wireless quality change pattern construction means 12, using the measurement information of wireless quality, constructs, as a wireless quality change pattern, a time-series data pattern of wireless quality associated with the passage of time.

The wireless quality prediction means 13, with respect to measurement information of wireless quality acquired from a prediction target wireless terminal, acquires a wireless quality change pattern having a high degree of similarity to the measurement information from the wireless quality change pattern construction means 12. The wireless quality prediction means 13, using the acquired wireless quality change pattern, predicts future wireless quality of the prediction target wireless terminal or a future change in a wireless cell to which the prediction target wireless terminal belongs.

Consequently, using a wireless quality change pattern that the wireless quality change pattern construction means 12 constructed, the wireless quality prediction device 1, based on measurement information of wireless quality that the measurement information acquisition means 11 acquired from a prediction target wireless terminal, predicts future wireless quality of the prediction target wireless terminal or a future change in a wireless cell to which the prediction target wireless terminal belongs by means of the wireless quality prediction means 13. In the above configuration, the measurement information of wireless quality is wireless quality measured by a wireless terminal that moves within a wireless communication system having two or more wireless cells. In addition, the wireless quality change pattern is a time-series data pattern of wireless quality associated with the passage of time. For this reason, even in the case of a sudden change in a propagation environment of a radio wave caused by a movement of a wireless terminal or a discontinuous change in wireless quality due to a switch of wireless cells to which the wireless terminal belongs, the wireless quality prediction device of the present example embodiment may predict the change. As the result, it becomes possible to predict a discontinuous change in wireless quality without using positional information of a wireless terminal.

Figure 2:
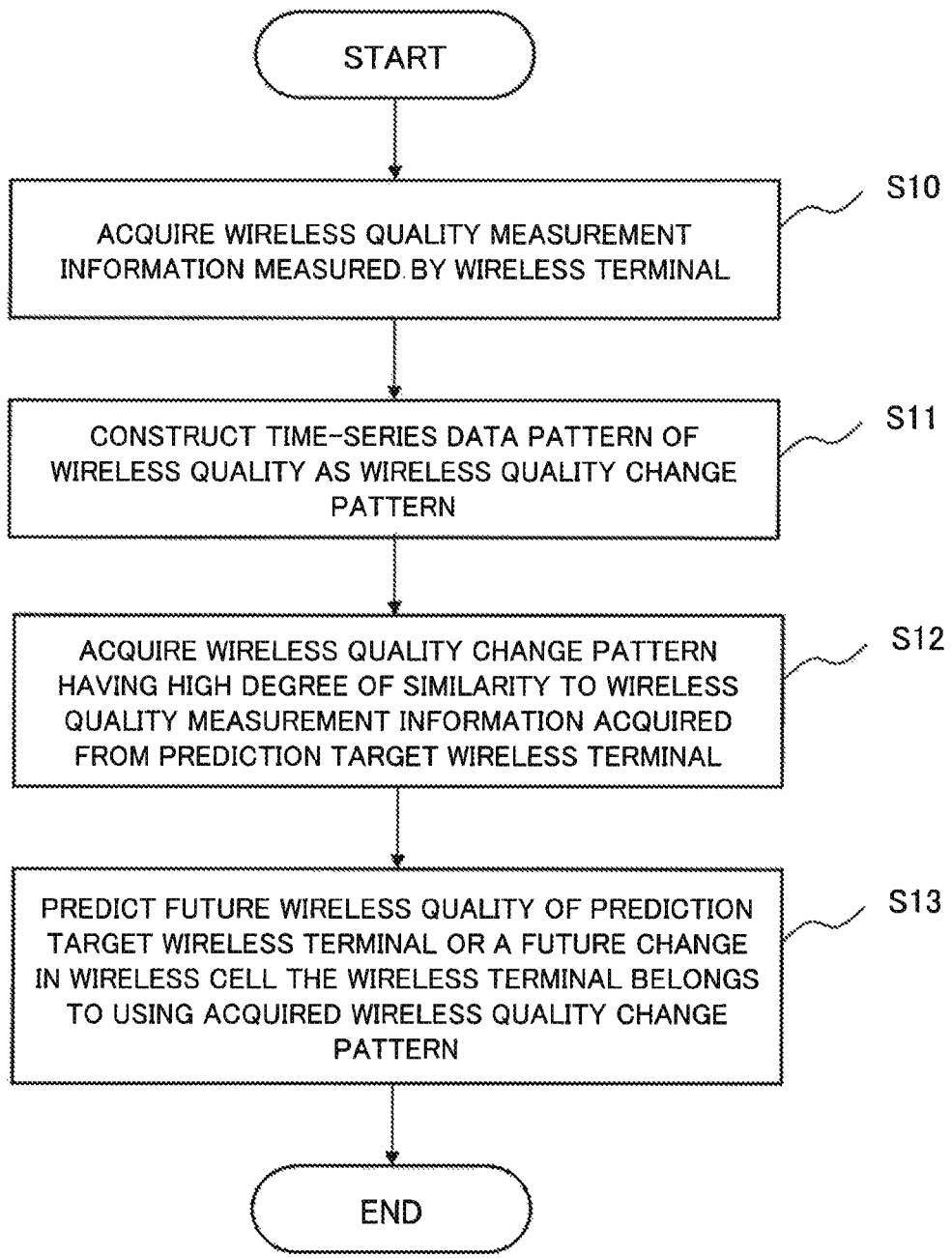
FIG. 2 is a flow diagram exemplifying an operation of a wireless quality prediction method according to the first example embodiment of the present invention.

FIG. 2 is a flow diagram exemplifying an operation of a wireless quality prediction method according to the first example embodiment of the present invention. The wireless quality prediction method according to the first example embodiment is executed by a wireless quality prediction device performing the following operation.

In the wireless quality prediction method according to the first example embodiment, the wireless quality prediction device operates as follows.

First, the wireless quality prediction device acquires measurement information of wireless quality measured by a wireless terminal that moves within a wireless communication system having two or more wireless cells (S10).

The wireless quality prediction device, using the measurement information of wireless quality, constructs, as a wireless quality change pattern, a time-series data pattern of wireless quality associated with the passage of time (S11).

The wireless quality prediction device, with respect to measurement information of wireless quality acquired from a prediction target wireless terminal, acquires a wireless quality change pattern having a high degree of similarity to the measurement information (S12).

The wireless quality prediction device, using the acquired wireless quality change pattern, predicts future wireless quality of the prediction target wireless terminal or a future change in a wireless cell to which the prediction target wireless terminal belongs (S13).

Consequently, using a constructed wireless quality change pattern, the wireless quality prediction method of the present example embodiment, based on measurement information of wireless quality acquired from a prediction target wireless terminal, predicts future wireless quality of the prediction target wireless terminal or a future change in a wireless cell to which the prediction target wireless terminal belongs. In the above operation, the measurement information of wireless quality is wireless quality measured by a wireless terminal that moves within a wireless communication system having two or more wireless cells. In addition, the wireless quality change pattern is a time-series data pattern of wireless quality associated with the passage of time. For this reason, even in the case of a sudden change in a propagation environment of a radio wave caused by a movement of a wireless terminal or a discontinuous change in wireless quality due to a switch of wireless cells to which the wireless terminal belongs, the wireless quality prediction method of the present example embodiment may predict the change. In consequence, it becomes possible to predict a discontinuous change in wireless quality without using positional information of a wireless terminal.

Figure 3:
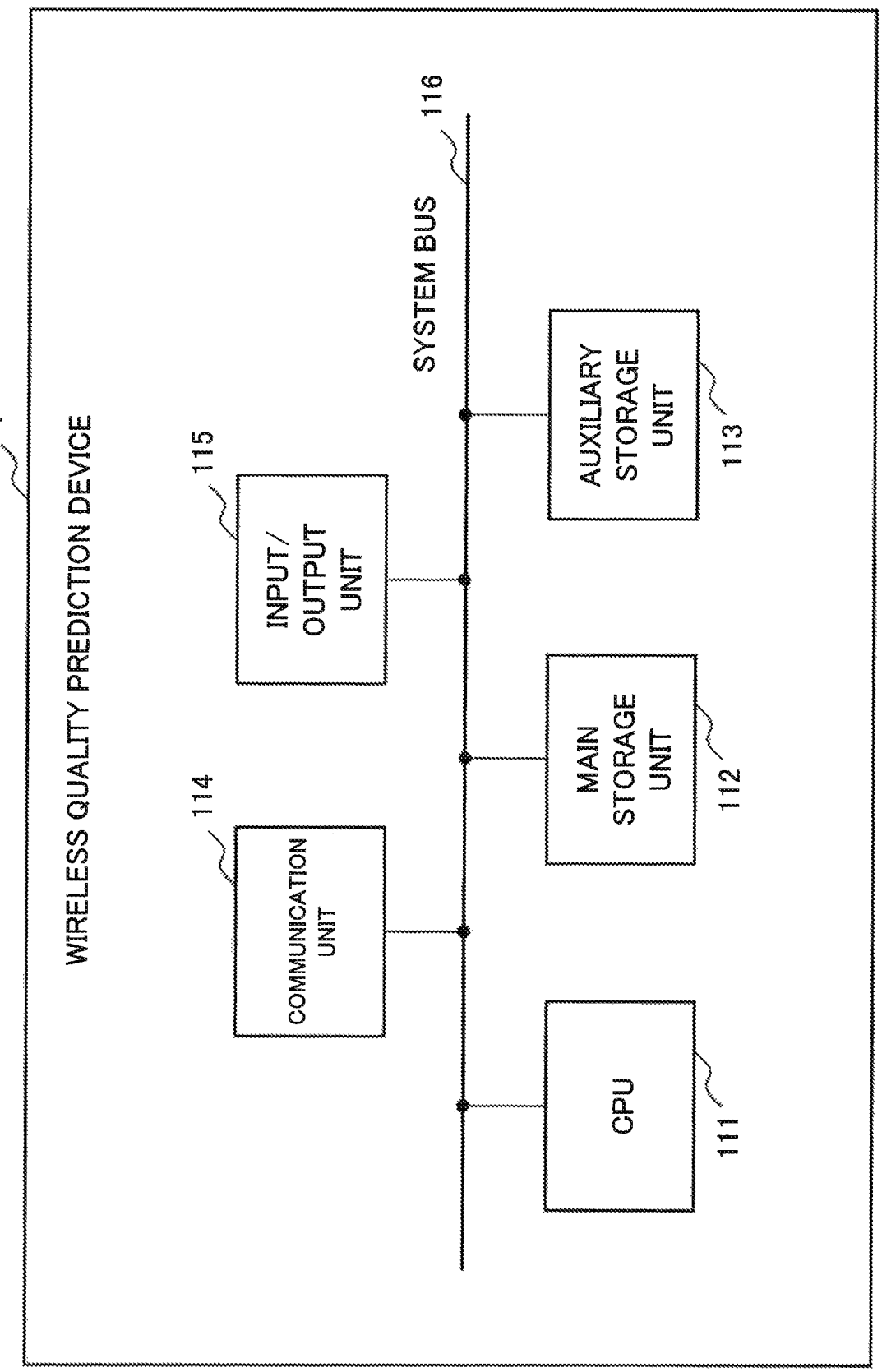
FIG. 3 is a block diagram exemplifying a hardware configuration of the wireless quality prediction device according to the first example embodiment of the present invention.

FIG. 3 is a diagram exemplifying a hardware configuration of the wireless quality prediction device according to the first example embodiment of the present invention.

With reference to FIG. 3, the wireless quality prediction device 1 may be achieved by means of a hardware configuration similar to that of a general computer device and includes the following components.

The hardware configuration includes a Central Processing Unit (CPU) 111, which is a control unit, a main storage unit 112, and an auxiliary storage unit 113. The main storage unit 112 is configured with a Random Access Memory (RAM) or the like, and the auxiliary storage device 113 includes a hard disk device configured with a non-volatile memory, such as a magnetic disk and a semiconductor memory.

In addition, the hardware configuration also includes a communication unit 114 that performs communication with the outside via a communication line, an input/output unit 115 as a man-machine interface, a system bus 116 that interconnect the above-described components, and the like.

In the wireless quality prediction device 1 of the present example embodiment, the operation thereof may be achieved by implementing, inside the wireless quality prediction device 1, circuit components made up of hardware components, such as a Large Scale Integration (LSI), into which programs achieving respective functions are incorporated. The wireless quality prediction device 1 of the present example embodiment may also be achieved in a software manner by executing programs providing respective functions of the components in the CPU 111 in a computer processing device.

That is, the CPU 111 achieves the respective functions in a software manner by controlling the operation of the wireless quality prediction device 1 through loading and executing programs stored in the auxiliary storage unit 113 in the main storage unit 112 or directly executing the programs in the auxiliary storage unit 113.

Figure 4:
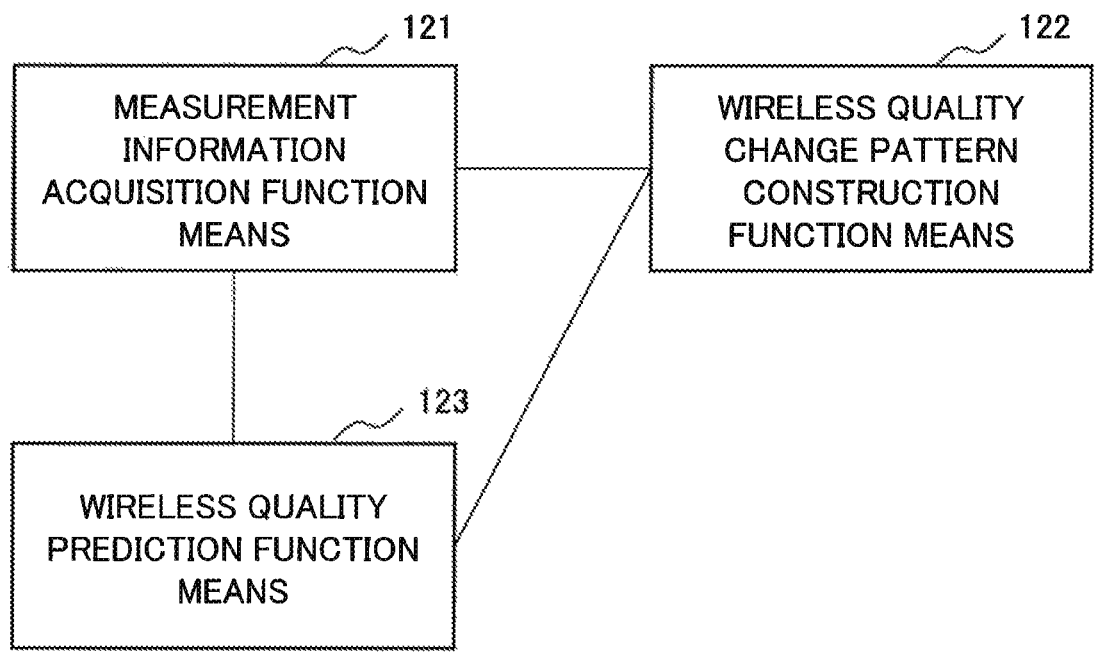
FIG. 4 is a block diagram exemplifying a configuration of function means that a wireless quality prediction program according to the first example embodiment of the present invention achieves.

A configuration of function means that a wireless quality prediction program of the first example embodiment of the present invention achieves is illustrated in FIG. 4.

FIG. 4 is a block diagram illustrating a configuration of function means that the wireless quality prediction program according to the first example embodiment of the present invention achieves.

The wireless quality prediction program of the present example embodiment makes a computer function as a measurement information acquisition function means 121, a wireless quality change pattern construction function means 122, and a wireless quality prediction function means 123.

The measurement information acquisition function means 121 acquires measurement information of wireless quality measured by a wireless terminal that moves within a wireless communication system having two or more wireless cells.

The wireless quality change pattern construction function means 122, using the measurement information of wireless quality, constructs, as a wireless quality change pattern, a time-series data pattern of wireless quality associated with the passage of time.

The wireless quality prediction function means 123, with respect to measurement information of wireless quality acquired from a prediction target wireless terminal, acquires a wireless quality change pattern having a high degree of similarity to the measurement information from the wireless quality change pattern construction function means 122. After that, the wireless quality prediction function means 123, using the acquired wireless quality change pattern, predicts future wireless quality of the prediction target wireless terminal or a future change in a wireless cell to which the prediction target wireless terminal belongs.

Consequently, the wireless quality prediction program makes a computer function to, using a wireless quality change pattern that the wireless quality change pattern construction function means 122 constructed, based on measurement information of wireless quality that the measurement information acquisition function means 121 acquired from a prediction target wireless terminal, predict future wireless quality of the prediction target wireless terminal or a future change in a wireless cell to which the prediction target wireless terminal belongs by means of the wireless quality prediction function means 123. In the above configuration, the measurement information of wireless quality is wireless quality measured by a wireless terminal that moves within a wireless communication system having two or more wireless cells. In addition, the wireless quality change pattern is a time-series data pattern of wireless quality associated with the passage of time. For this reason, even in the case of a sudden change in a propagation environment of a radio wave caused by a movement of a wireless terminal or a discontinuous change in wireless quality due to a switch of wireless cells to which the wireless terminal belongs, the wireless quality prediction program of the present example embodiment may make a computer function to predict the change. As the result, it becomes possible to predict a discontinuous change in wireless quality without using positional information of a wireless terminal.

Figure 5:
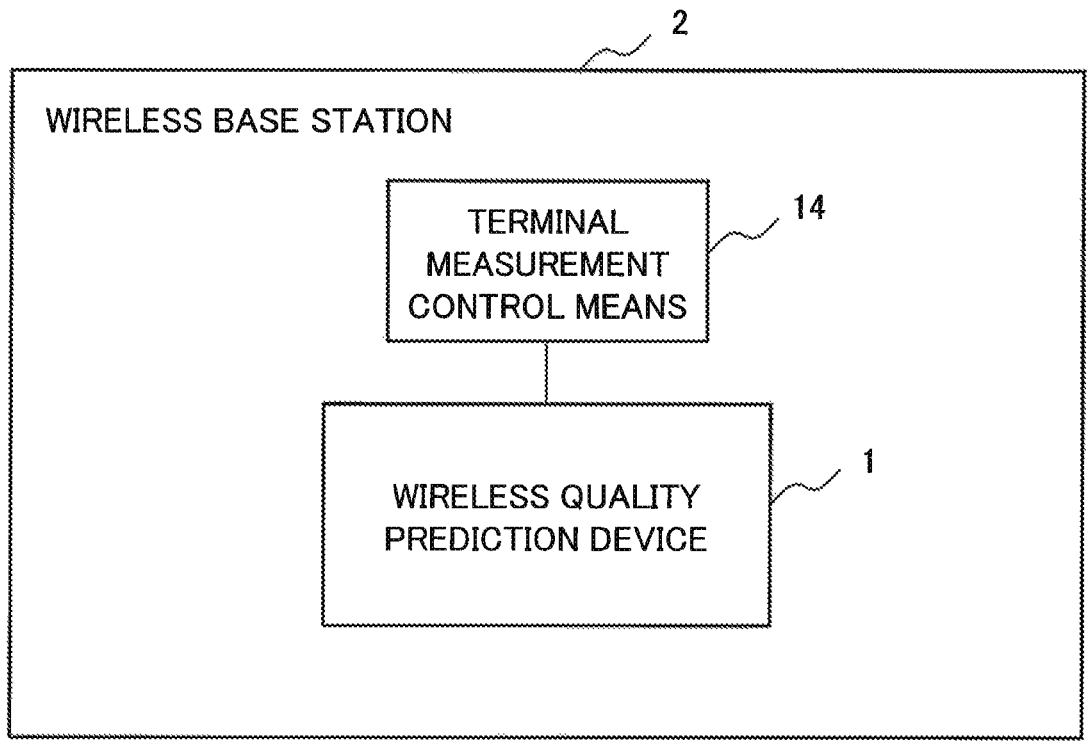
FIG. 5 is a block diagram exemplifying a configuration of a wireless base station including the wireless quality prediction device according to the first example embodiment of the present invention.

FIG. 5 is a block diagram exemplifying a configuration of a wireless base station including a wireless quality prediction device according to the first example embodiment of the present invention. The wireless quality prediction device 1 according to the first example embodiment of the present invention may be achieved in an embodiment where the wireless quality prediction device 1 is included in a wireless base station 2, as illustrated in FIG. 5.

The wireless base station 2 is configured by including the wireless quality prediction device 1 and a terminal measurement control means 14. The terminal measurement control means 14 instructs a not-illustrated wireless terminal to measure and report wireless quality, acquires measurement information of wireless quality measured by the wireless terminal, and outputs the measurement information of wireless quality to the wireless quality prediction device 1.

In this case, using a constructed wireless quality change pattern, the wireless base station 2, based on measurement information of wireless quality acquired from a prediction target wireless terminal, predicts future wireless quality of the prediction target wireless terminal or a future change in a wireless cell to which the prediction target wireless terminal belongs by means of the wireless quality prediction device 1, which the wireless base station 2 is equipped with. In the above configuration, the measurement information of wireless quality is wireless quality measured by a wireless terminal that moves within a wireless communication system having two or more wireless cells. In addition, the wireless quality change pattern is a time-series data pattern of wireless quality associated with the passage of time. For this reason, even in the case of a sudden change in a propagation environment of a radio wave caused by a movement of a wireless terminal or a discontinuous change in wireless quality due to a switch of wireless cells to which the wireless terminal belongs, the wireless base station including the wireless quality prediction device may predict the change. As the result, it becomes possible to predict a discontinuous change in wireless quality without using positional information of a wireless terminal.

Figure 6:
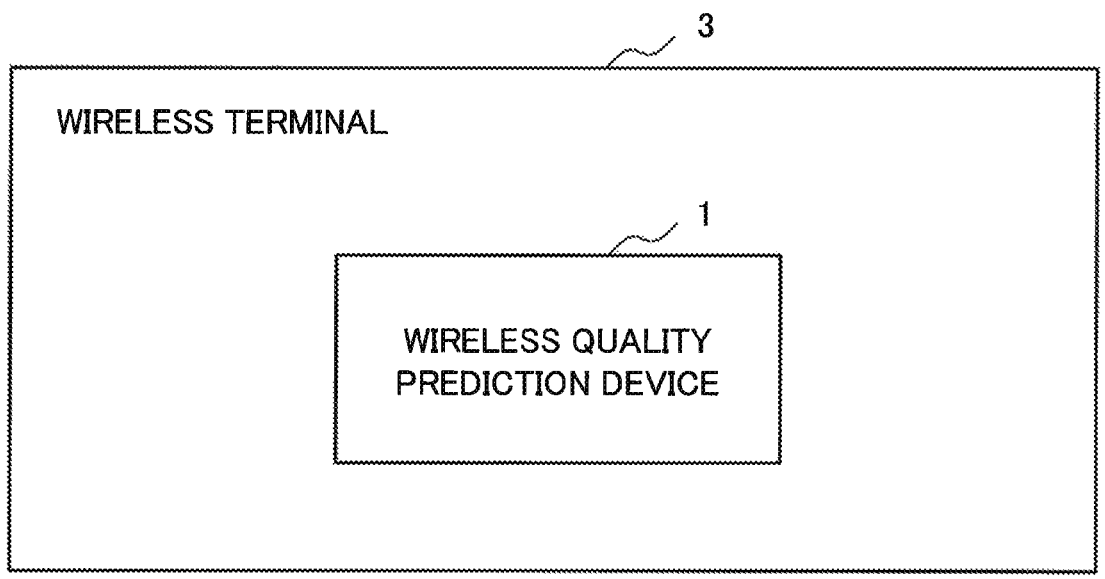
FIG. 6 is a block diagram exemplifying a configuration of a wireless terminal including the wireless quality prediction device according to the first example embodiment of the present invention.

FIG. 6 is a block diagram exemplifying a configuration of a wireless terminal including a wireless quality prediction device according to the first example embodiment of the present invention. The wireless quality prediction device 1 according to the first example embodiment of the present invention may be achieved in an embodiment where the wireless quality prediction device 1 is included in a wireless terminal 3, as illustrated in FIG. 6.

In this case, using a constructed wireless quality change pattern, the wireless terminal 3, based on measurement information of wireless quality acquired by the wireless terminal 3, predicts future wireless quality of the wireless terminal 3 or a future change in a wireless cell to which the wireless terminal 3 belongs by means of the wireless quality prediction device 1, which the wireless terminal 3 is equipped with. In the above configuration, the measurement information of wireless quality is wireless quality measured by the wireless terminal 3, which moves within a wireless communication system having two or more wireless cells. In addition, the wireless quality change pattern is a time-series data pattern of wireless quality associated with the passage of time. For this reason, even in the case of a sudden change in a propagation environment of a radio wave caused by a movement of a wireless terminal or a discontinuous change in wireless quality due to a switch of wireless cells to which the wireless terminal belongs, the wireless terminal including the wireless quality prediction device may predict the change. As the result, it becomes possible to predict a discontinuous change in wireless quality without using positional information of a wireless terminal.

Second Example Embodiment

A second example embodiment will be described in detail with reference to FIGS. 7 to 16.

Figure 7:
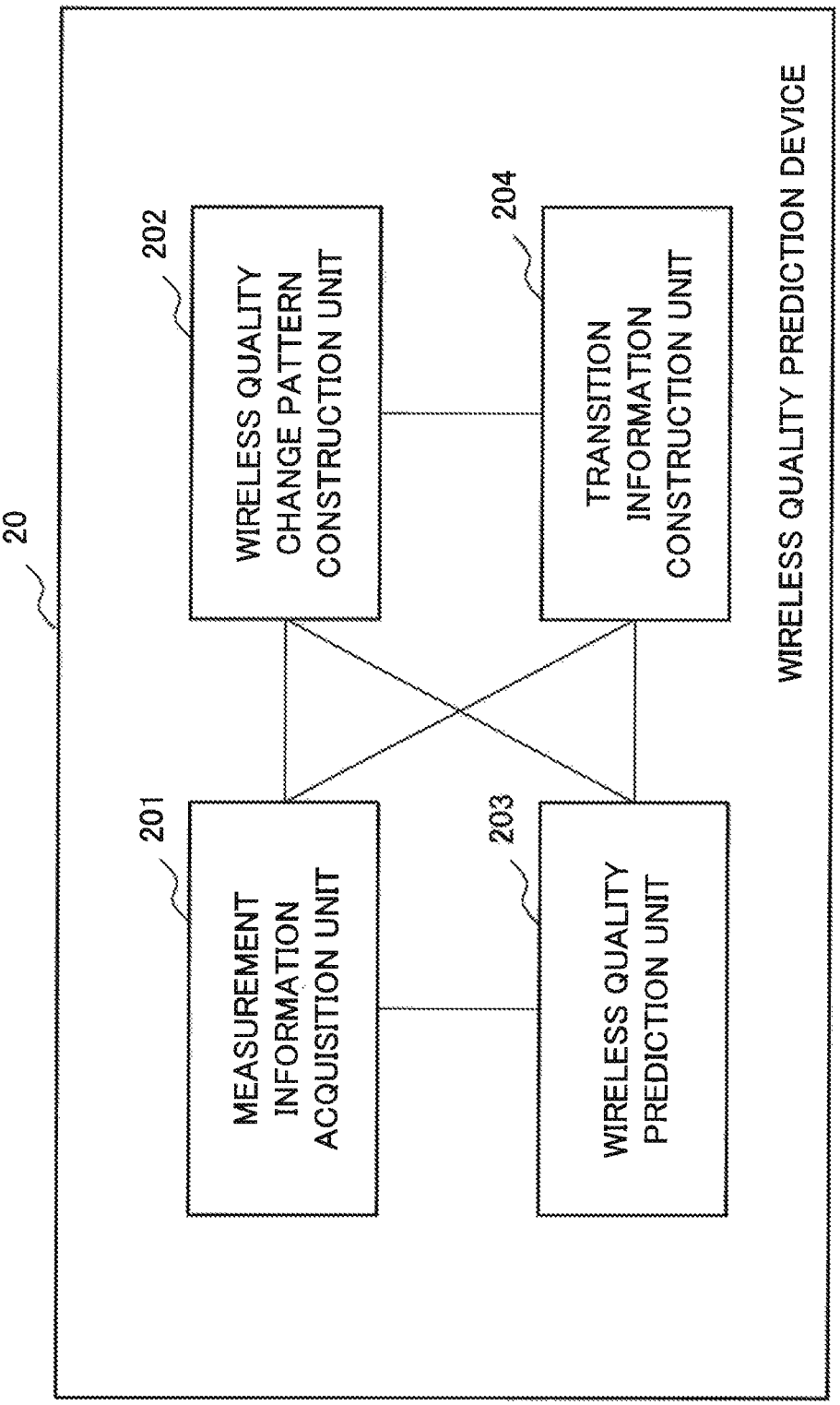
FIG. 7 is a block diagram exemplifying a configuration of a wireless quality prediction device according to a second example embodiment of the present invention.

FIG. 7 is a block diagram exemplifying a configuration of a wireless quality prediction device according to the second example embodiment of the present invention.

Figure 8:
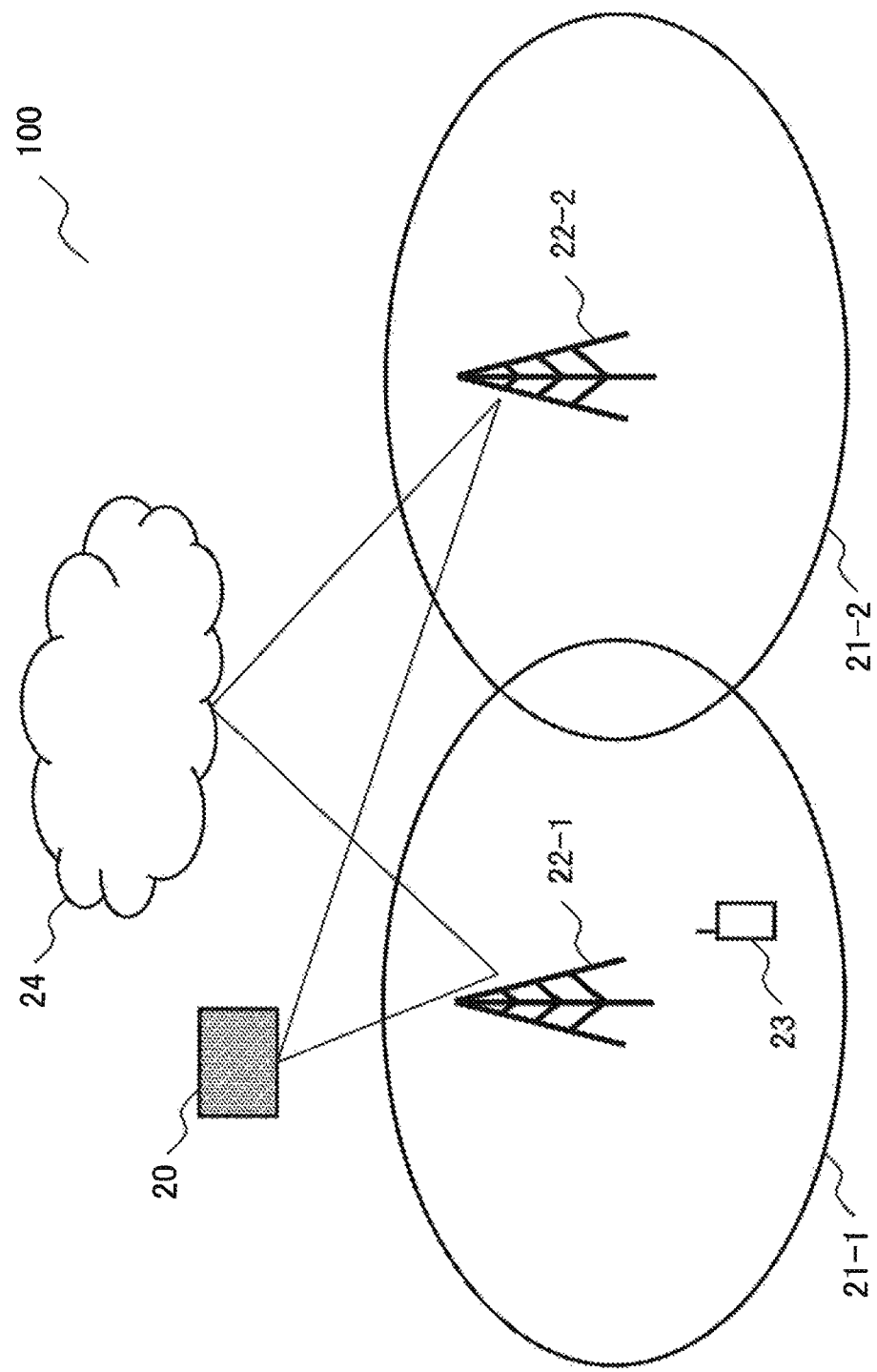
FIG. 8 is a diagram exemplifying a configuration of a wireless communication system to which the wireless quality prediction device according to the second example embodiment of the present invention is applied.

In addition, FIG. 8 is a diagram exemplifying a configuration of a wireless communication system to which the wireless quality prediction device according to the second example embodiment of the present invention is applied.

Figure 9:
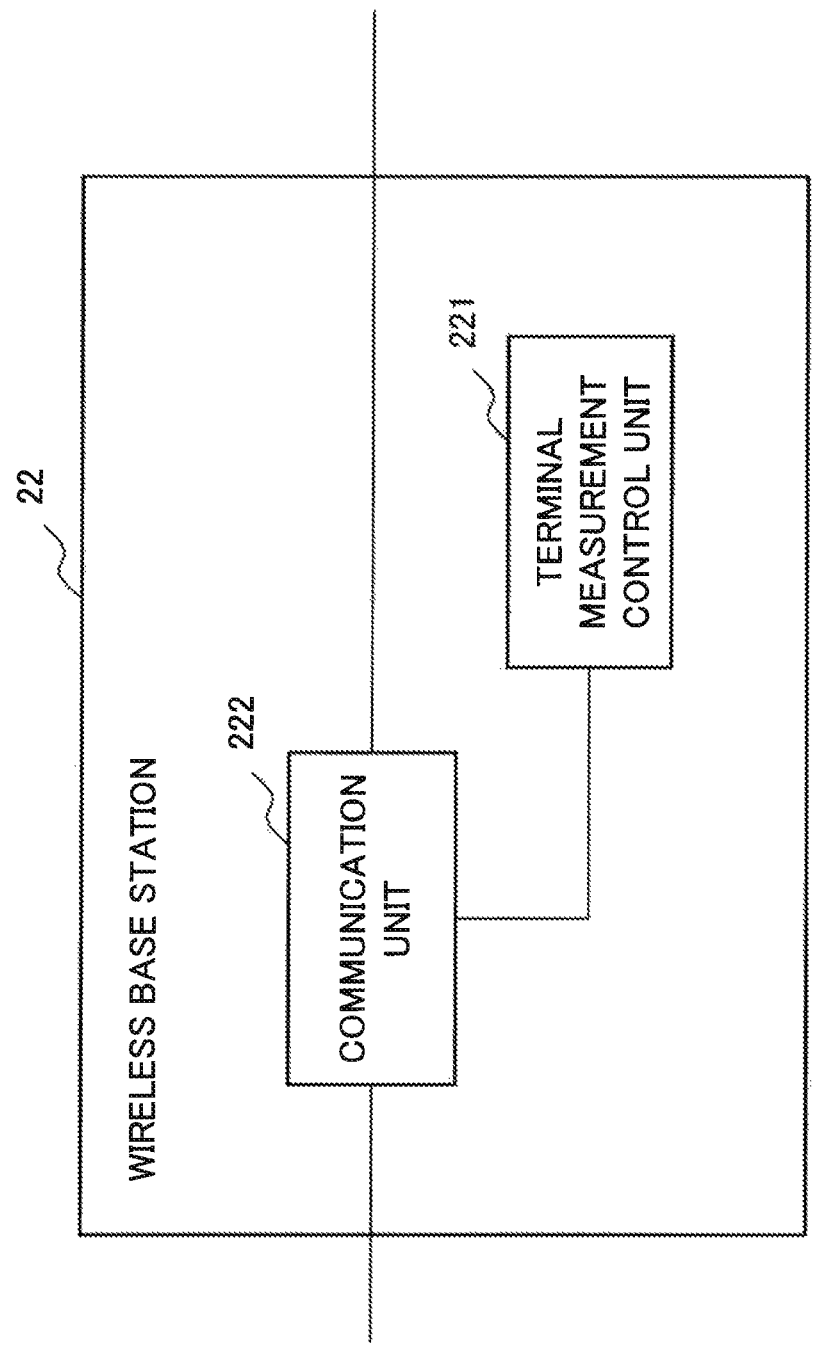
FIG. 9 is block a diagram exemplifying a configuration of a wireless base station in the wireless communication system to which the wireless quality prediction device according to the second example embodiment of the present invention is applied.

Further, FIG. 9 is a block diagram exemplifying a configuration of a wireless base station in the wireless communication system.

[Description of Configuration]

First, with reference to FIG. 8, a wireless communication system 100 to which the wireless quality prediction device according to the second example embodiment of the present invention is applied will be described.

The wireless communication system 100 includes a wireless quality prediction device 20, wireless base stations 22 (wireless base stations 22-1 and 22-2), wireless cells 21 (wireless cells 21-1 and 21-2), a wireless terminal 23, and an upper level network 24.

The wireless base station 22-1 manages the wireless cell 21-1. Meanwhile, the wireless base station 22-2 manages the wireless cell 21-2. The wireless terminal 23 moves within the wireless communication system 100, connects to the wireless cell 21-1 or the wireless cell 21-2 via a wireless link, and performs bidirectional wireless communication with the wireless base station 22-1 or the wireless base station 22-2.

Each of the wireless base stations 22-1 and 22-2 is connected to the upper level network 24, and relays traffic between the upper level network 24 and the wireless terminal 23.

Note that each wireless base station 22 is, for example, a macro-wireless base station covering a wide area, a micro-wireless base station or a pico-wireless base station covering a relatively small area, a femto-wireless base station that is a small-sized wireless base station for indoor use, or the like. In addition, the wireless terminal 23 is a terminal having a wireless communication function and is a feature phone, a smart phone, a tablet terminal, a notebook-type personal computer (Laptop Computer), or the like. Further, the upper level network 24 is equivalent to, for example, a wireless access network, a core network, the Internet, or the like.

Specific examples of the wireless communication system 100 include an LTE, an LTE-Advanced, a UMTS, a GSM, a WiMAX, a CDMA2000, an HSPA, and the like. Note that LTE, UMTS, and GSM are the acronyms of Long Term Evolution, Universal Mobile Telecommunications System, and Global System for Mobile Communications, respectively. In addition, WiMAX, CDMA, and HSPA are the acronyms of Worldwide Interoperability for Microwave Access, Code Division Multiple Access, and High Speed Packet Access, respectively.

The numbers of respective components constituting the wireless communication system 100 illustrated in FIG. 8 are only an example, and the present invention is not limited to a mode illustrated in FIG. 8. That is, the wireless communication system 100 may have a configuration in which three or more wireless base stations 22 are included or may have a configuration in which two or more wireless terminals 23 are included. The wireless communication system 100 may also have a configuration in which each wireless base station 22 manages two or more wireless cells 21.

Since conventional devices are usable as it is for the wireless terminal 23 and the upper level network 24, and configurations thereof are well known for those skilled in the art, drawings illustrating detailed configurations thereof and a description of related matters thereto will be omitted.

FIG. 9 is a block diagram exemplifying a configuration of each wireless base station 22. With reference to FIG. 9, the wireless base station 22 includes a communication unit 222 and a terminal measurement control unit 221.

The communication unit 222 provides fundamental functions as the wireless base station 22. The fundamental functions as the wireless base station 22 include, for example, an interface function with the upper level network 24, a wireless interface function with the wireless terminal 23, a baseband signal processing function, a call processing function, and the like. Since these fundamental functions are well known for those skilled in the art, a detailed description thereof will be omitted.

Further, the communication unit 222 has a communication function with the wireless quality prediction device 20.

The terminal measurement control unit 221, using the communication unit 222, instructs the wireless terminal 23 to measure and report wireless quality. Note that an instruction for measurement and report of wireless quality to the wireless terminal 23 may be transmitted from a measurement information acquisition unit 201 in the wireless quality prediction device 20, which will be described later with reference to FIG. 7, or a not-illustrated device residing in the upper level network 24 via the wireless base station 22.

The terminal measurement control unit 221 is capable of, using the communication unit 222, acquiring measurement information of wireless quality measured by the wireless terminal 23. The terminal measurement control unit 221 is also capable of transmitting the measurement information to the wireless quality prediction device 20. The measurement information of wireless quality preferably includes identification information of a wireless cell to which the wireless terminal 23 belonged when having measured the wireless quality, identification information of the wireless terminal 23, and information indicating a time at which the wireless quality was measured.

The instruction for measurement and report of wireless quality to the wireless terminal 23 by the terminal measurement control unit 221 is made by using, for example, an RRC CONNECTION RECONFIGURATION message when an LTE network is used.

The RRC CONNECTION RECONFIGURATION message includes a Measurement Object and a Report Configuration. The Measurement Object is information indicating a frequency used in and wireless cell identification information of a wireless cell where the wireless terminal 23 is required to perform measurement, and the like. The Report Configuration is information indicating a trigger condition that represents when the wireless terminal 23 performs measurement and report. Note that trigger conditions include two types of conditions, a predetermined period and an event trigger. For example, setting the predetermined period to the trigger condition enables the wireless base station 22 to collect measurement information measured by the wireless terminal 23 at a specified period of time.

The terminal measurement control unit 221 is capable of, to obtain a wireless quality change concerning the wireless terminal 23, instructing the wireless terminal 23 to measure and report wireless quality at every predetermined period of time (for example, 1 sec., 2 sec., 5 sec., 10 sec., and the like).

In the configuration, a wireless terminal 23 to be instructed to measure and report wireless quality may be determined as follows in, for example, model construction processing, which will be described later.

All wireless terminals 23 that have established wireless links with the wireless base station 22 may be selected as the Measurement Object, or some wireless terminals 23 that have established wireless links with the wireless base station 22 may be selected as the Measurement Object (for example, 20 percent of the wireless terminals may be selected at random). Alternatively, only a predetermined wireless terminal 23 that is to be subject to prediction in prediction processing, which will be described later, may be selected to be instructed to measure and report wireless quality.

In addition, in the prediction processing, which will be described later, a predetermined wireless terminal 23 subject to prediction is to be instructed to measure and report wireless quality.

Note that examples of wireless quality include received power and a desired wave to interference wave power ratio. The received power represents reception strength of a pilot signal or a reference signal in a target wireless cell. The received power includes, for example, Common Pilot Channel Received Signal Code Power (CPICH RSCP) in UMTS, Reference Signal Received Power (RSRP) in LTE, and the like. Meanwhile, the desired wave to interference wave power ratio represents a ratio of received power of a signal received from a target wireless cell to interference power and/or thermal noise power. The desired wave to interference wave power ratio includes, for example, Signal to Interference plus Noise Ratio (SINR), SIR, CPICH Ec/No in UMTS, Reference Signal Received Quality (RSRQ) in LTE, and the like. Note that wireless quality may take continuous values or discrete values. When wireless quality takes discrete values, an indicator, such as a Quality Class Indicator (QCI), may be used.

With reference to FIG. 7, a configuration of the wireless quality prediction device 20 of the second example embodiment will be described.

With reference to FIG. 7, the wireless quality prediction device 20 includes a measurement information acquisition unit 201, a wireless quality change pattern construction unit 202, a transition information construction unit 204, and a wireless quality prediction unit 203.

The measurement information acquisition unit 201 acquires measurement information of wireless quality measured by the wireless terminal 23.

The wireless quality change pattern construction unit 202, using measurement information of wireless quality acquired by the measurement information acquisition unit 201, constructs a wireless quality change pattern.

The wireless quality change pattern is information associated with a wireless cell and, in conjunction therewith, information indicating a change in wireless quality measured by an identical wireless terminal while the wireless terminal belongs to the wireless cell.

As a specific example, the wireless quality change pattern construction unit 202, by associating a change in wireless quality (time-series data) measured by an identical wireless terminal periodically while the wireless terminal belongs to an identical wireless cell with information identifying the identical wireless cell, constructs a wireless quality change pattern. The wireless quality change pattern construction unit 202 is capable of retaining wireless quality change patterns constructed in this manner, targeting one or more wireless terminal and two or more wireless cells.

Note that it is preferable to associate a start point and an end point of each wireless quality change pattern with a point of time at which a wireless terminal starts to belong to a concerned wireless cell and a point of time at which the wireless terminal ends to belong to the wireless cell, respectively. For example, wireless quality measured by a wireless terminal 23 periodically during a period from a point of time at which the wireless terminal 23 is handed over to the wireless cell 21-1 to a point of time at which the wireless terminal 23 is handed over to a wireless cell other than the wireless cell 21-1 (for example, the wireless cell 21-2) is constructed into a wireless quality change pattern.

Figure 10:
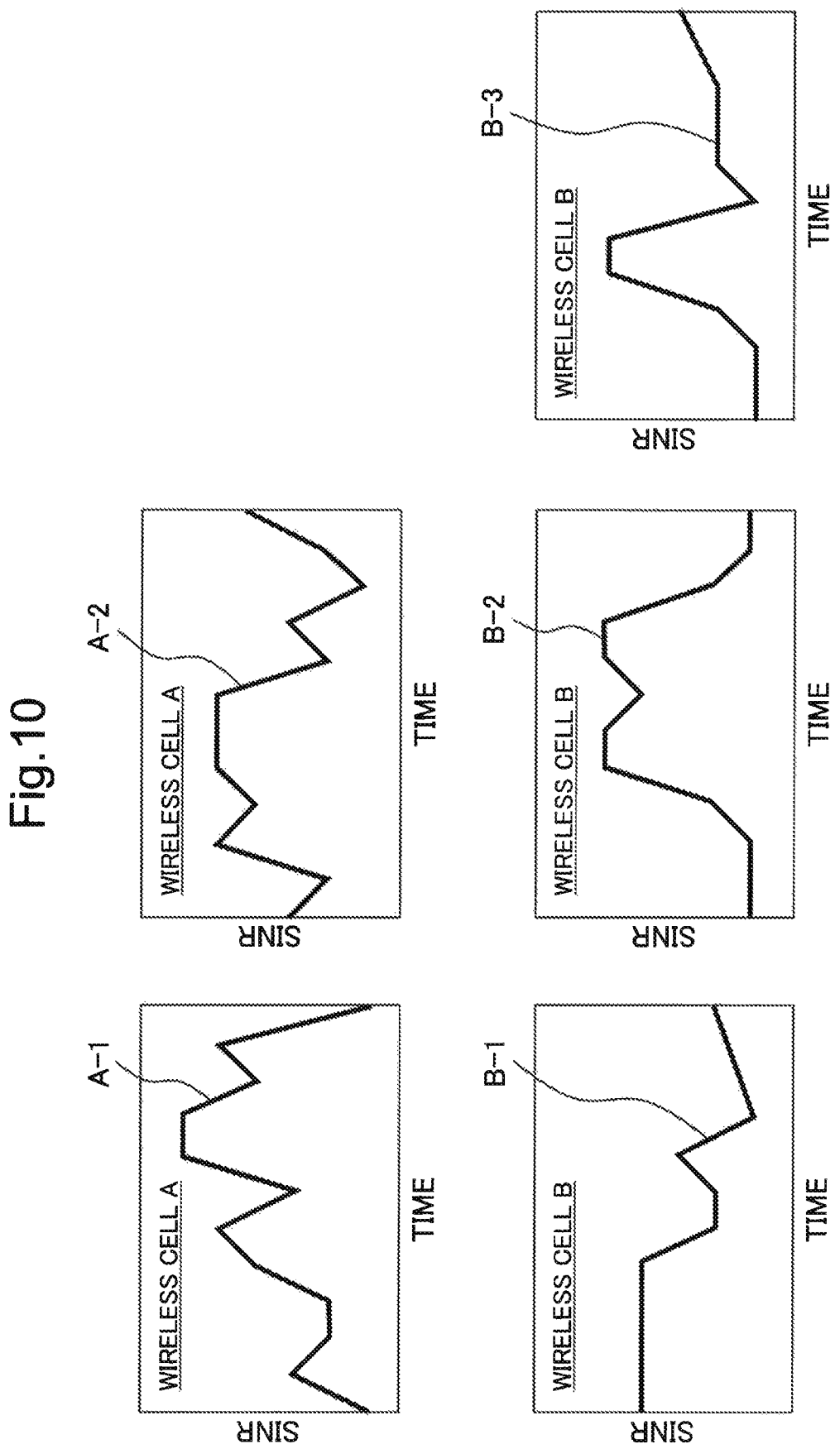
FIG. 10 is a diagram illustrating an example of wireless quality change patterns.

With reference to FIG. 10, wireless quality change patterns will be described.

FIG. 10 is an explanatory diagram illustrating an example of wireless quality change patterns retained by the wireless quality change pattern construction unit 202. In FIG. 10, wireless quality change patterns A-1 and A-2 and wireless quality change patterns B-1, B-2, and B-3 are wireless quality change patterns measured in a wireless cell A and a wireless cell B, respectively. The vertical axes and the horizontal axes of the graphs in FIG. 10 represent wireless quality (as an example, using SINR) and time, respectively. The time represented by the horizontal axes of the graphs may be absolute time represented by date and time or relative time with the start point of each wireless quality change pattern set at "0". The time represented by the horizontal axes of the graphs may also be time normalized in such a way that the start point and the end point of each wireless quality change pattern coincide with "0" and "1", respectively.

The transition information construction unit 204 constructs information indicating transition relationships (transition information) between two or more wireless quality change patterns.

Specifically, the transition information construction unit 204 constructs and retains, as transition information, past records such as the numbers of times or probabilities that arbitrary two wireless quality change patterns were temporally continuously measured by an identical wireless terminal.

With respect to two wireless quality change patterns measured by an identical wireless terminal, the two wireless quality change patterns are determined to have been temporally continuously measured in the following cases.

As an example, when a time difference between the date and time of the end point of one of the two wireless quality change patterns and the date and time of the start point of the other wireless quality change pattern is less than or equal to a predetermined period of time, the two wireless quality change patterns are determined to have been temporally continuously measured. As another example, when, with respect to a wireless cell C1 where one of the two wireless quality change patterns was measured and a wireless cell C2 where the other wireless quality change pattern was measured, the wireless terminal moves directly from the wireless cell C1 to the wireless cell C2 without going through another wireless cell, the two wireless quality change patterns are determined to have been temporally continuously measured. Note that, in this case, even when the wireless terminal went through another wireless cell before having moved from the wireless cell C1 to the wireless cell C2, the fact of belonging to the another wireless cell may be ignored when the duration of belonging to the another wireless cell is short. In other words, even in such a case, the two wireless quality change patterns may be determined to have been temporally continuously measured.

With reference to FIG. 11, transition information will be described.

FIG. 11 is an explanatory diagram illustrating an example of transition information retained by the transition information construction unit 204.

In FIG. 11, an example in which transition probabilities between wireless quality change patterns are constructed as transition information is illustrated.

In FIG. 11, each of A-1, A-2, B-1, B-2, and B-3 indicates an identifier of a wireless quality change pattern. A-1 and A-2 and B-1, B-2, and B-3 represent wireless quality change patterns in the wireless cell A and the wireless cell B, respectively.

Further, each numerical value in the table in FIG. 11 indicates a probability that, after a wireless quality change pattern represented by an identifier in the leftmost column has been measured, a wireless quality change pattern represented by an identifier in the uppermost row is temporally continuously measured.

That is, FIG. 11 indicates that probabilities that, after the wireless quality change pattern A-1 had been measured, the respective wireless quality change patterns B-1, B-2, and B-3 were temporally continuously measured are set as follows. The probabilities that, after the wireless quality change pattern A-1 had been measured, the wireless quality change patterns B-1, B-2, and B-3 were measured are 0.0, 0.7, and 0.3, respectively.

Similarly, FIG. 11 indicates that probabilities that, after the wireless quality change pattern A-2 had been measured, the respective wireless quality change patterns B-1, B-2, and B-3 were temporally continuously measured are set as follows. The probabilities that, after the wireless quality change pattern A-2 had been measured, the wireless quality change patterns B-1, B-2, and B-3 were measured are 1.0, 0.0, and 0.0, respectively.

Note that, although each numerical value in the table in FIG. 11, as described above, represents a probability, the numerical value may represent the number of times that measurement was actually performed.

For example, the numerical values may be expressed such that the number of times that the wireless quality change pattern A-1 was measured is 10 in total and the numbers of times that the measurement subsequently transited to measurement of the respective wireless quality change patterns B-1, B-2, and B-3 in a temporally continuous manner are 0, 7, and 3, respectively.

As described above, the transition information is information expressing transition relationships between wireless quality change patterns in transition probabilities or the numbers of times of transitions according to past records of wireless quality change patterns measured by an identical wireless terminal and transits therebetween.

Note that transition information may be individually constructed for each wireless terminal or transition information common to a plurality of wireless terminals may be constructed. When transition information is individually constructed for each wireless terminal, a piece of transition information is associated with a wireless terminal and is constructed using only wireless quality change patterns measured by the wireless terminal. Meanwhile, when transition information common to a plurality of wireless terminals is constructed, the transition information common to the plurality of wireless terminals is constructed using wireless quality change patterns measured by the plurality of wireless terminals.

The wireless quality prediction unit 203, using measurement information of wireless quality acquired from a wireless terminal 23 subject to prediction, predicts future wireless quality of the wireless terminal 23 subject to prediction. The wireless quality prediction unit 203, using the measurement information of wireless quality acquired from the wireless terminal 23 subject to prediction, also predicts a wireless cell to which the wireless terminal 23 subject to prediction is to belong in the future. In the above description, the future means, using a point of time at which the acquired measurement information of wireless quality was measured by the wireless terminal 23 subject to prediction as a reference point, an arbitrary point of time on and after the point of time.

Specifically, the wireless quality prediction unit 203 acquires a wireless quality change pattern having a high degree of similarity to the measurement information of wireless quality acquired from the wireless terminal 23 subject to prediction from the wireless quality change pattern construction unit 202. The wireless quality prediction unit 203 may, by using the acquired wireless quality change pattern, predict future wireless quality of the wireless terminal 23 subject to prediction.

In addition, the wireless quality prediction unit 203 may, by using the acquired wireless quality change pattern and transition information retained by the transition information construction unit 204, acquire a wireless quality change pattern having a high possibility of succeeding the acquired wireless quality change pattern. The acquisition enables the wireless quality prediction unit 203 to predict a wireless cell to which the wireless terminal 23 subject to prediction is likely to belong in the future and wireless quality in the wireless cell to which the wireless terminal 23 subject to prediction is likely to belong in the future.

Further, the wireless quality prediction unit 203 may predict a timing at which a wireless cell to which the wireless terminal 23 subject to prediction belongs changes.

For example, a case is considered where change in wireless quality (time-series data) measured by an identical wireless terminal periodically while the wireless terminal belongs to an identical wireless cell is retained in the wireless quality change pattern construction unit 202 in association with information identifying the identical wireless cell. In this case, retention of a time length of each wireless quality change pattern enables the wireless quality prediction unit 203 to predict, with respect to a wireless terminal 23 subject to prediction, when a wireless quality change pattern switches to a next wireless quality change pattern, that is, at what point of time a wireless cell to which the wireless terminal 23 belongs switches to a next wireless cell.

[Description of Operation]

A wireless quality prediction method according to the present example embodiment will be described with reference to FIGS. 12 to 15.

Figure 12:
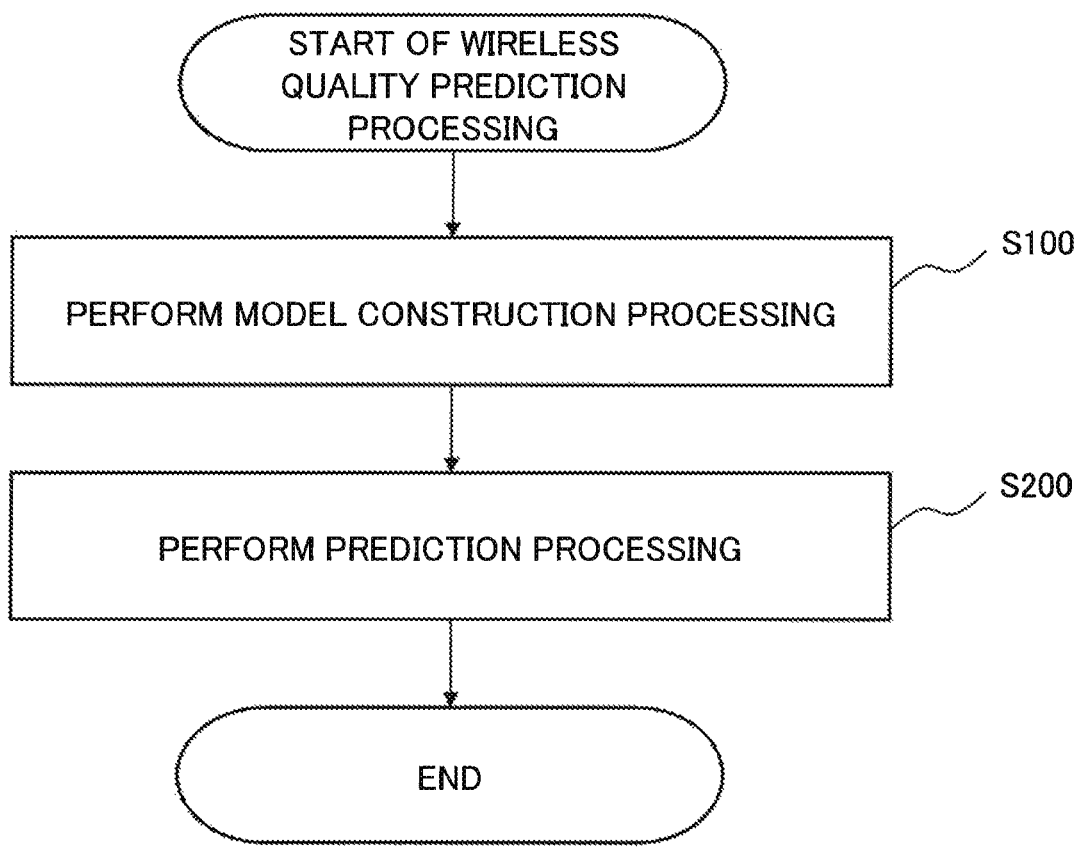
FIG. 12 is a flow diagram exemplifying an operation of a wireless quality prediction method according to the second example embodiment of the present invention.

FIG. 12 is a flow diagram exemplifying an operation of the wireless quality prediction method according to the second example embodiment of the present invention.

Note that the wireless quality prediction method will be described as wireless quality prediction processing performed by the wireless quality prediction device 20.

As described in the flow diagram in FIG. 12, the wireless quality prediction processing performed by the wireless quality prediction device 20 includes model construction processing (S100) and prediction processing (S200).

In other words, in the model construction processing in step S100, the wireless quality change pattern construction unit 202 constructs a wireless quality change pattern. Further, the transition information construction unit 204 constructs transition information.

In the prediction processing in step S200, using a wireless quality change pattern and transition information constructed in the model construction processing, the wireless quality prediction unit 203, with respect to a prediction target wireless terminal, predicts future wireless quality or a wireless cell to which the wireless terminal is to belong in the future.

Hereinafter, details of the model construction processing and the prediction processing will be described.

First, a specific example of the model construction processing will be described with reference to a flow diagram in FIG. 13.

Figure 13:
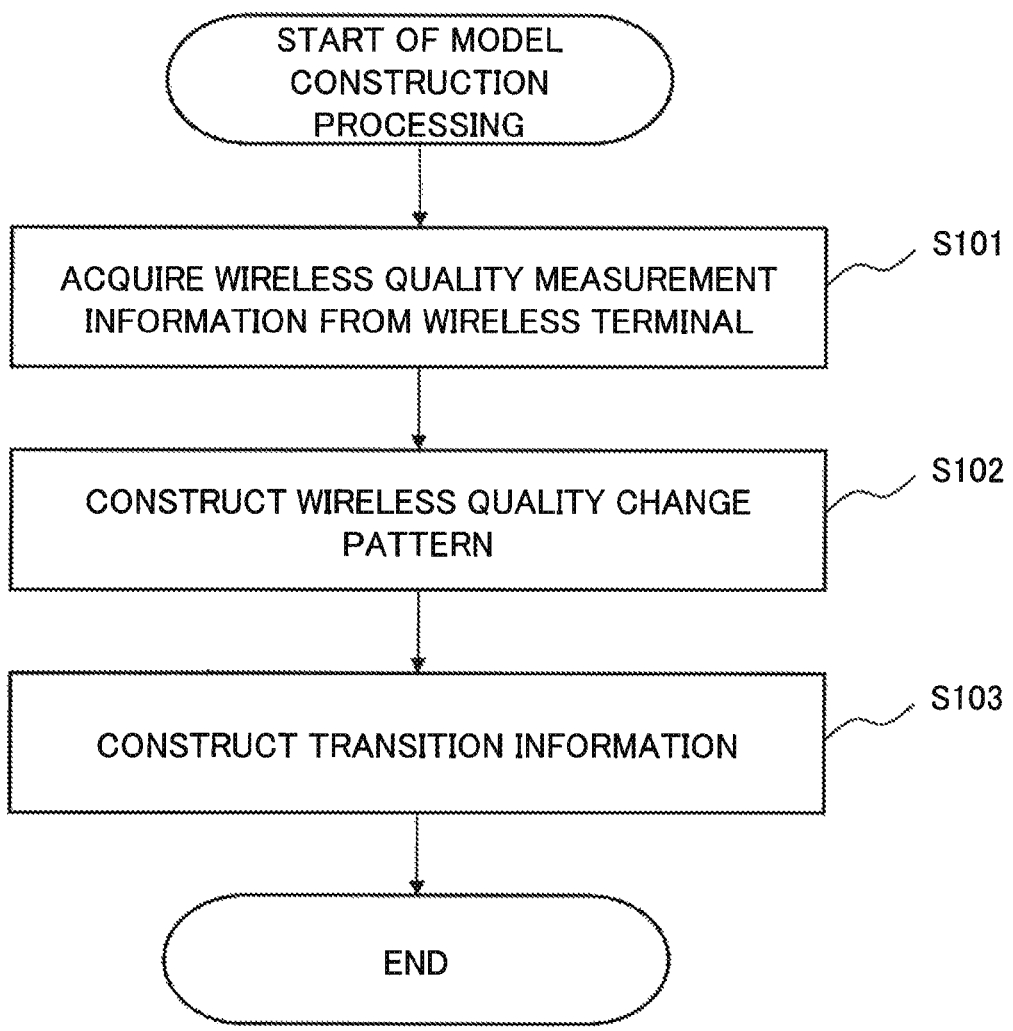
FIG. 13 is a flow diagram exemplifying model construction processing in the wireless quality prediction method according to the second example embodiment of the present invention.

FIG. 13 is a flow diagram exemplifying the model construction processing in the wireless quality prediction method according to the second example embodiment of the present invention.

Measurement information of wireless quality measured by a wireless terminal 23 instructed to measure and report wireless quality is transmitted from a wireless base station 22 to the wireless quality prediction device 20. As described afore, wireless terminals 23 that are to be instructed to measure and report wireless quality may be all wireless terminals 23 that have established wireless links with the wireless base station 22 or some wireless terminals 23 that are selected at random. Alternatively, only a predetermined wireless terminal 23 that is to be subject to prediction in the prediction processing, which will be described later, may be determined to be instructed to measure and report wireless quality.

First, the measurement information acquisition unit 201 acquires measurement information of wireless quality measured by a wireless terminal 23 (S101). For example, the wireless base station 22, at a timing when acquiring measurement information of wireless quality from the wireless terminal 23, transmits the measurement information to the wireless quality prediction device 20. Alternatively, the measurement information acquisition unit 201 periodically inquires a wireless base station 22 of whether or not the wireless base station 22 has new measurement information and, when the wireless base station 22 has new measurement information, acquires the measurement information from the wireless base station 22.

Subsequently, the wireless quality change pattern construction unit 202 constructs a wireless quality change pattern (S102). As described above, the wireless quality change pattern construction unit 202 construct, as a wireless quality change pattern, change (time-series data) in wireless quality that was measured by an identical wireless terminal while the wireless terminal belonged to an identical wireless cell in conjunction with information identifying the identical wireless cell.

The transition information construction unit 204 constructs transition information that is information indicating transition relationships between two or more wireless quality change patterns. As described above, the transition information construction unit 204 constructs and retains, as transition information, past records such as the numbers of times or probabilities that arbitrary two wireless quality change patterns are temporally continuously measured by an identical wireless terminal.

Next, a specific example of the prediction processing will be described with reference to a flow diagram in FIG. 14.

Figure 14:
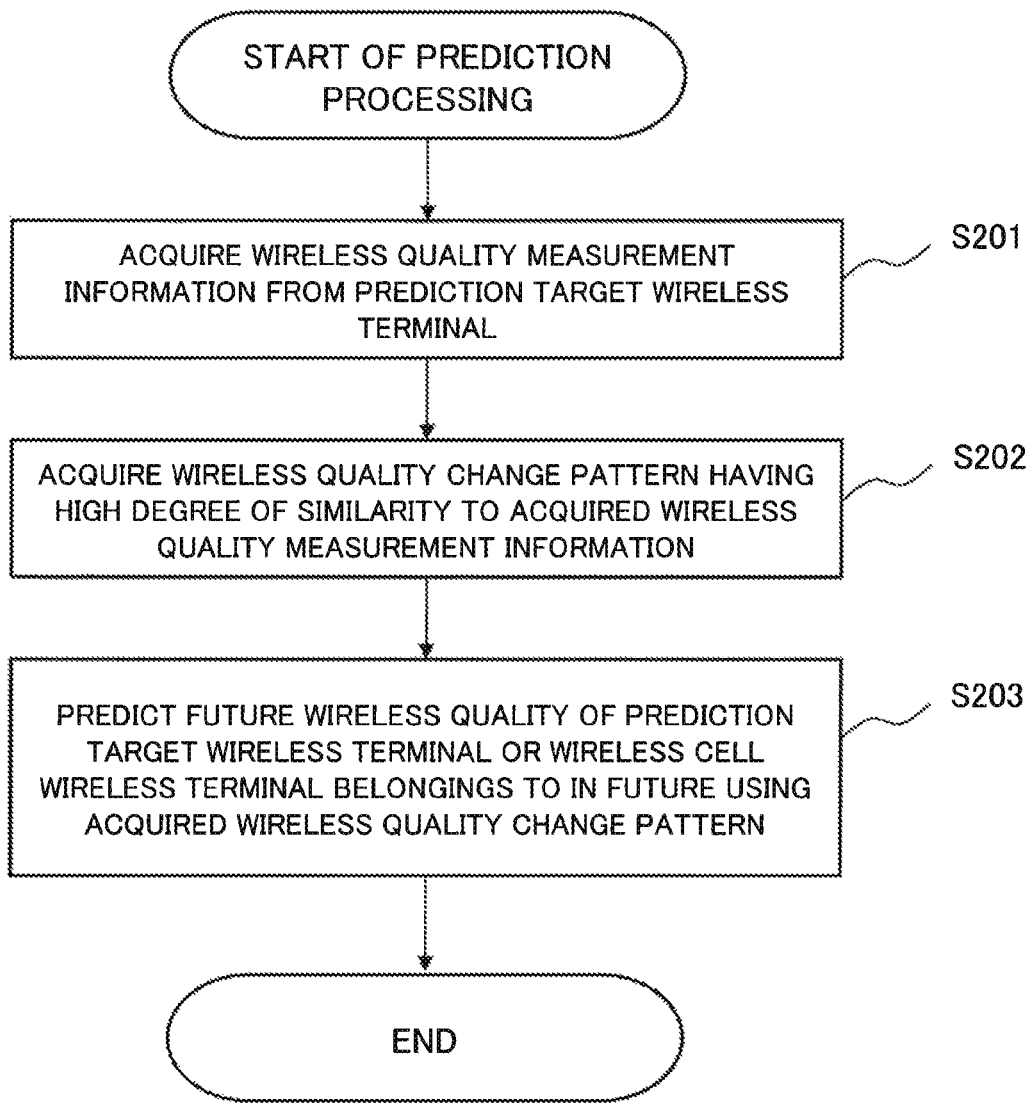
FIG. 14 is a flow diagram exemplifying prediction processing in the wireless quality prediction method according to the second example embodiment of the present invention.

FIG. 14 is a flow diagram exemplifying the prediction processing in the wireless quality prediction method according to the second example embodiment of the present invention.

The following description will be made using, as an example, a case where the wireless quality change pattern construction unit 202 retains the wireless quality change patterns illustrated in FIG. 10 and the transition information construction unit 204 retains the transition information illustrated in FIG. 11.

Note that the prediction processing may be started periodically or in an event triggered manner. Triggering events include, for example, start of a communication with a prediction target wireless terminal, detection of a handover event, completion of a handover, and the like.

In addition, wireless terminals subject to prediction may include all wireless terminals 23 that have established wireless links with a wireless base station 22 or some wireless terminals 23 of the wireless terminals 23 that have established wireless links with the wireless base station 22. In the above description, some wireless terminals 23 of the wireless terminals 23 that have established wireless links with the wireless base station 22 are, for example, wireless terminals as follows: a wireless terminal that has packet data required to be transmitted to the wireless terminal within the network (for example, in the wireless base station 22); a wireless terminal with which a specific application is performing communication; a wireless terminal classified into a specific user class; a wireless terminal classified into a specific device type; a wireless terminal belonging to a specific area or cell; and the like.

Measurement information of wireless quality is transmitted from a wireless terminal that is to be subject to prediction and that was instructed to measure and report wireless quality by the wireless base station 22. In the above operation, an instruction for measurement and report of wireless quality to a prediction target wireless terminal may be made using the same method as the afore-described instruction method to a wireless terminal 23 when a wireless quality change pattern is constructed.

First, the measurement information acquisition unit 201 acquires measurement information of wireless quality from a wireless terminal 23 subject to prediction (S201). In the following description, the acquired measurement information of wireless quality is denoted by X={X1, X2, ..., X10}. In the denotation, {X1, X2, ..., X10} represents SINRs measured for 10 seconds at an interval of 1 second since the wireless terminal 23 started to belong to a wireless cell A.

The wireless quality prediction unit 203 acquires a wireless quality change pattern having a high degree of similarity to the measurement information of wireless quality, acquired from the wireless terminal 23 subject to prediction, from the wireless quality change pattern construction unit 202 (S202).

Specifically, the wireless quality prediction unit 203 acquires wireless quality change patterns A-1 and A-2, which are wireless quality change patterns in the wireless cell A, out of the wireless quality change patterns illustrated in FIG. 10. The wireless quality prediction unit 203 calculates a degree of similarity between the measurement information X of wireless quality, acquired from the wireless terminal 23 subject to prediction, and each of the wireless quality change patterns A-1 and A-2.

For example, results of extraction of wireless quality transition values corresponding to a period of 10 seconds from the top out of the wireless quality change patterns A-1 and A-2 are denoted by Y={Y1, Y2, ..., Y10} and Z={Z1, Z2, ..., Z10}, respectively. A degree Dxy of similarity between X and Y and a degree Dxz of similarity between X and Z are respectively calculated. For example, considering a set of time-series data as a vector and using Euclidean distance between two vectors enable a degree of similarity to be defined. When Euclidean distance is used, degrees Dxy and Dxz of similarity can be calculated using, for example, the formulas below.

$$Dxy = \frac{1}{\sqrt{(X1-Y1)^2 + (X2-Y2)^2 + \ldots + (X10-Y10)^2}}$$

The above formulas indicate that, the shorter is the Euclidean distance, the higher the degree of similarity becomes, and, the longer is the Euclidean distance, the lower the degree of similarity becomes.

Note that use of Euclidean distance as an index indicating a degree of similarity is only an exemplification, and the degree of similarity is not limited to the Euclidean distance. For example, a correlation coefficient may be used as an index indicating a degree of similarity. Specifically, wireless quality values are paired for each corresponding time between two wireless quality change patterns. Using the paired wireless quality values for each corresponding time, a correlation coefficient between the wireless quality change patterns is calculated. The degree of similarity between the wireless quality change patterns is determined to have a higher value as the correlation coefficient increases.

The wireless quality prediction unit 203 may acquire only one wireless quality change pattern having a highest degree of similarity or a predetermined number of wireless quality change patterns in descending order of the degree of similarity. In both cases, a threshold value may be set for the degree of similarity and a wireless quality change pattern having a degree of similarity lower than the threshold value may be removed from acquisition targets.

The wireless quality prediction unit 203, using the wireless quality change pattern acquired in step S202, predicts future wireless quality of the wireless terminal 23 subject to prediction or a wireless cell to which the wireless terminal 23 is to belong in the future (S203).

Using FIG. 15, a specific example of a method for predicting future wireless quality of a wireless terminal 23 subject to prediction and a wireless cell to which the wireless terminal 23 is to belong in the future will be described.

Figure 15:
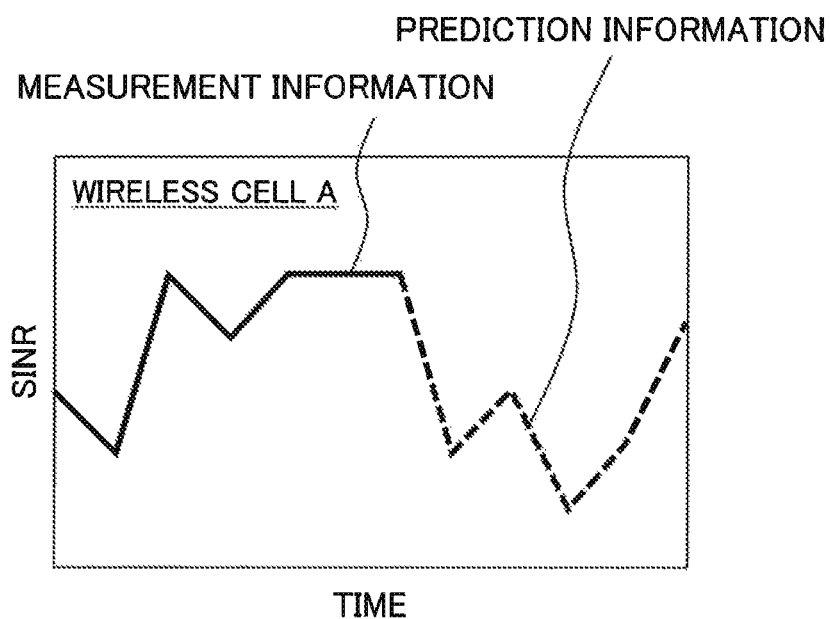
FIG. 15 is a diagram describing a specific example of the prediction processing according to the second example embodiment of the present invention.

FIG. 15 is a diagram describing a specific example of the prediction processing according to the second example embodiment of the present invention.

In FIG. 15, a solid line portion of a line graph indicates measurement information of wireless quality acquired from a wireless terminal 23 subject to prediction. It is assumed that, as a wireless quality change pattern having a high degree of similarity to the measurement information of wireless quality, the wireless quality change pattern A-2 in FIG. 10 is acquired.

It may be assumed that future wireless quality of the wireless terminal 23 subject to prediction follows a change similar to the wireless quality change pattern A-2. For this reason, estimating a dotted line portion of the line graph in FIG. 15 referring to the wireless quality change pattern A-2 enables future wireless quality of the wireless terminal 23 subject to prediction to be predicted.

Further, the wireless quality prediction unit 203 may, using transition information retained by the transition information construction unit 204, predict a wireless cell to which the wireless terminal 23 subject to prediction is to belong next. By using the transition information illustrated in FIG. 11, the wireless quality prediction unit 203 may determine that a probability that, after the wireless quality change pattern A-2 has been measured in the wireless cell A, the wireless quality change pattern B-1 is measured in the wireless cell B is 1.0. That is, the wireless quality prediction unit 203 may predict that a wireless cell to which the wireless terminal 23 subject to prediction is to belong next is the wireless cell B.

In addition, by using the wireless quality change pattern B-1, the wireless quality prediction unit 203 may also predict wireless quality in the wireless cell B, which is a wireless cell to which the wireless terminal 23 subject to prediction is to belong next.

Note that, when two or more wireless quality change patterns are acquired in step S202, the wireless quality prediction unit 203 may obtain predicted values of wireless quality from each wireless quality change pattern and obtain a range of values that future wireless quality may take. Alternatively, in place of obtaining a range of values that future wireless quality may take, the wireless quality prediction unit 203 may obtain predicted values of wireless quality from each wireless quality change pattern and obtain a statistic of future wireless quality. For example, as a statistic, an expected value, a median value, a value at the lowest 5 percent of a Cumulative Distribution Function (CDF), or the like may be obtained.

Further, the wireless quality prediction unit 203 may adjust time scales of wireless quality change patterns to be compared when calculating a degree of similarity. Details in the calculation of a degree of similarity by adjusting time scales will be described later in a third example embodiment.

As described above, in the wireless quality prediction device 20 according to the present example embodiment, the wireless quality change pattern construction unit 202 constructs a wireless quality change patterns. The transition information construction unit 204 constructs transition information that is information indicating transition relationships between two or more wireless quality change patterns in the form of the numbers of times or probabilities that arbitrary two wireless quality change patterns are temporally continuously measured. The wireless quality prediction unit 203 acquires a wireless quality change pattern having a high degree of similarity to measurement information of wireless quality acquired from a wireless terminal 23 subject to prediction from the wireless quality change pattern construction unit 202. The wireless quality prediction unit 203, using the acquired wireless quality change pattern, predicts future wireless quality of the wireless terminal 23 subject to prediction or a wireless cell to which the wireless terminal 23 subject to prediction is to belong in the future. The above configuration enables the wireless quality prediction device 20 according to the present example embodiment to predict a discontinuous change in wireless quality without using positional information of a wireless terminal.

In addition, the wireless quality prediction device 20 of the second example embodiment may be configured with the hardware illustrated in FIG. 3. In this case, the configuration includes a wireless quality prediction program that makes a computer function as respective function means.

Figure 16:
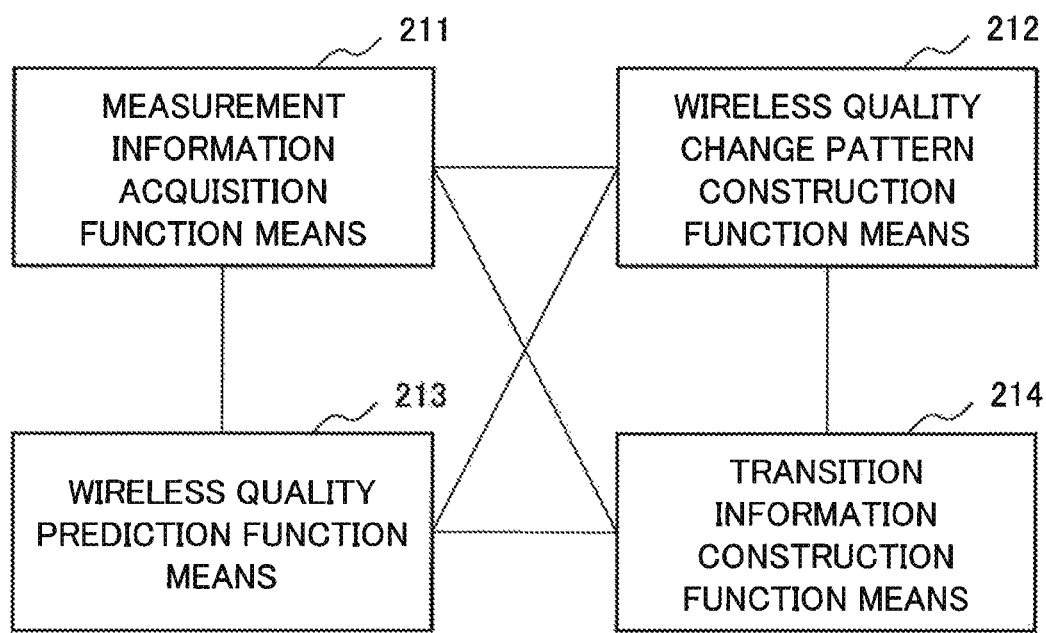
FIG. 16 is a block diagram exemplifying a configuration of function means that a wireless quality prediction program according to the second example embodiment of the present invention achieves.

FIG. 16 is a block diagram exemplifying a configuration of function means that the wireless quality prediction program according to the second example embodiment of the present invention achieves.

The wireless quality prediction program according to the second example embodiment includes a measurement information acquisition function means 211, a wireless quality change pattern construction function means 212, a transition information construction function means 214, and a wireless quality prediction function means 213. Functions that the respective function means described above achieve correspond to the measurement information acquisition unit 201, the wireless quality change pattern construction unit 202, the transition information construction unit 204, and the wireless quality prediction unit 203, which were described afore, respectively.

Third Example Embodiment

A third example embodiment will be described in detail with reference to FIGS. 17 to 19.

Note that a wireless quality prediction device according to the third example embodiment is also applied to the wireless communication system 100 exemplified in FIG. 8.

[Description of Configuration]

Figure 17:
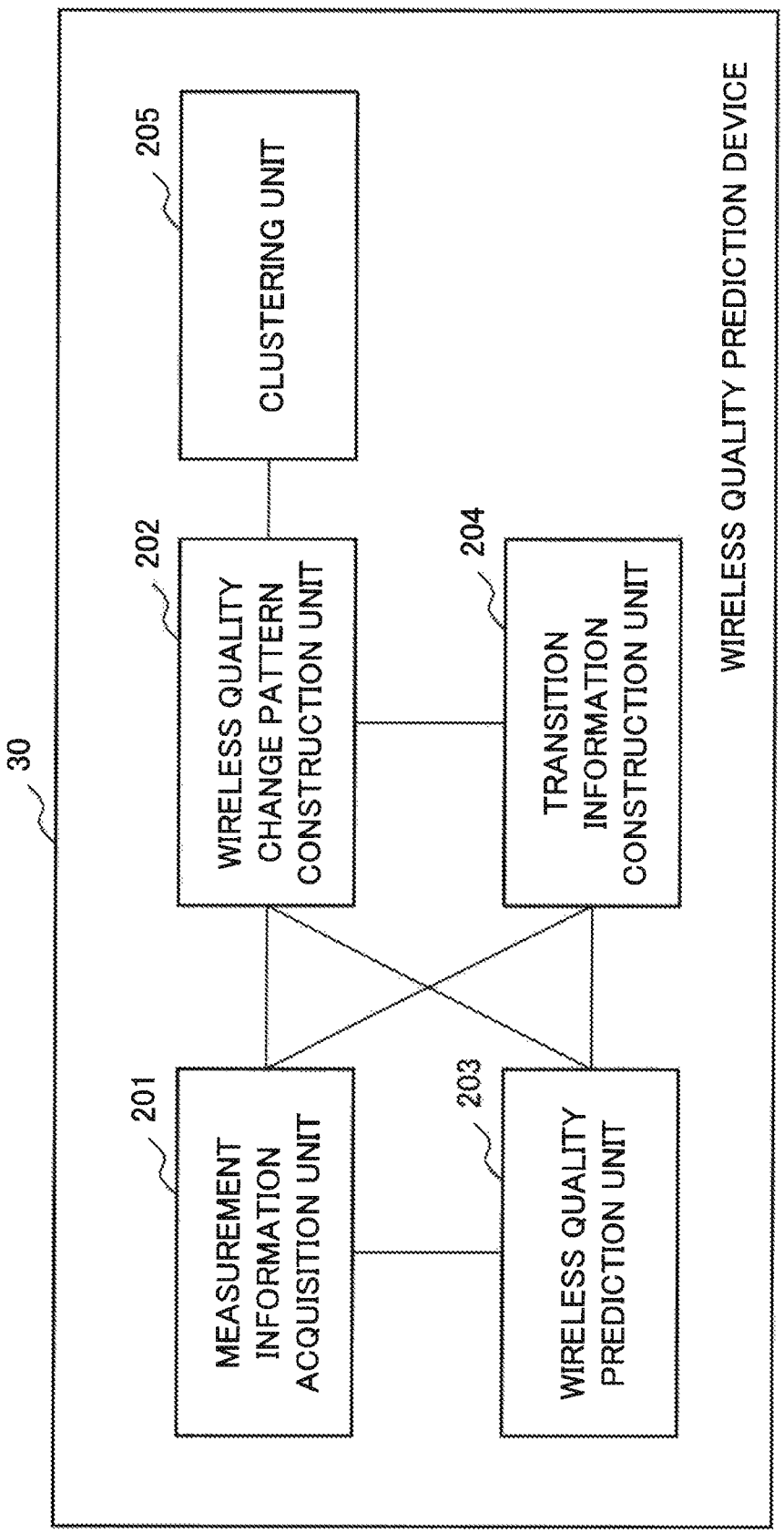
FIG. 17 is a block diagram exemplifying a configuration of a wireless quality prediction device according to a third example embodiment of the present invention.

FIG. 17 is a block diagram illustrating a configuration example of the wireless quality prediction device according to the present example embodiment. A wireless quality prediction device 30 according to the present example embodiment differs from the wireless quality prediction device 20 according to the second example embodiment of the present invention in including a clustering unit 205.

The clustering unit 205 calculates degrees of similarity among wireless quality change patterns associated with an identical wireless cell and, based on the calculated degrees of similarity, classifies two or more wireless quality change patterns associated with the identical wireless cell into a group(s).

[Description of Operation]

A specific example of wireless quality prediction processing performed by the wireless quality prediction device 30 according to the present example embodiment will be described.

The wireless quality prediction processing according to the present example embodiment, as with the second example embodiment having been described with reference to FIG. 12, includes model construction processing and prediction processing. Meanwhile, the model construction processing according to the present example embodiment differs from the model construction processing in the second example embodiment, having been described with reference to FIG. 13, in processing of constructing a wireless quality change pattern (step S102 in FIG. 13).

Using FIG. 18, the construction processing of a wireless quality change pattern according to the present example embodiment will be described.

Figure 18:
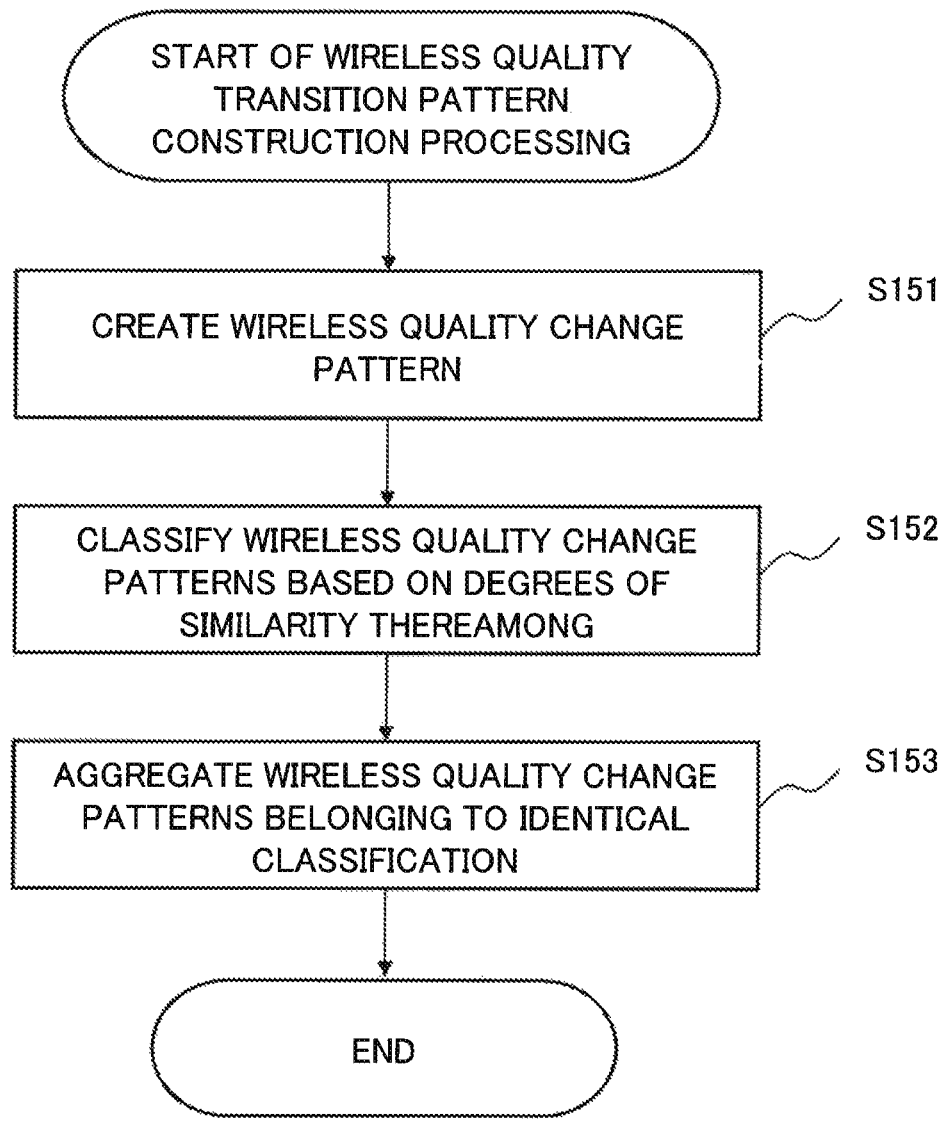
FIG. 18 is a flow diagram exemplifying wireless quality change pattern construction processing in a wireless quality prediction method according to the third example embodiment of the present invention.

FIG. 18 is a flow diagram exemplifying the wireless quality change pattern construction processing in a wireless quality prediction method according to the third example embodiment of the present invention.

A wireless quality change pattern construction unit 202, using measurement information of wireless quality acquired from a wireless terminal 23 by a measurement information acquisition unit 201, creates a new wireless quality change pattern (S151). As with the second example embodiment, the wireless quality change pattern is preferably information associated with a wireless cell and, in conjunction therewith, information indicating a change in wireless quality measured by an identical wireless terminal 23 while the wireless terminal 23 belongs to the wireless cell.

Subsequently, the clustering unit 205 classifies wireless quality change patterns, based on degrees of similarity thereamong (S152).

In step S152, a specific operation is performed as follows.

First, it is assumed that the wireless quality change pattern created in step S151 is a wireless quality change pattern P and the wireless quality change pattern P is information measured in a wireless cell C.

On this occasion, the clustering unit 205 extracts a wireless quality change pattern(s) associated with the wireless cell C out of the wireless quality change patterns retained by the wireless quality change pattern construction unit 202.

The clustering unit 205, out of the extracted wireless quality change pattern(s) associated with an identical wireless cell (the wireless cell C), specifies a wireless quality change pattern(s) the degree(s) of similarity of which to the wireless quality change pattern P is/are higher than or equal to a predetermined value. The clustering unit 205 classifies the specified wireless quality change pattern(s) and the wireless quality change pattern P into an identical group. Note that, when no wireless quality change pattern the degree of similarity of which to the wireless quality change pattern P is higher than or equal to a predetermined value is included in the extracted wireless quality change pattern(s), the clustering unit 205 stores the wireless quality change pattern P as a new group in the wireless quality change pattern construction unit 202.

For a degree of similarity between wireless quality change patterns calculated by the clustering unit 205, an index using Euclidean distance described in the second example embodiment, and the like may be used.

In addition, when calculating a degree of similarity by comparing two wireless quality change patterns, the clustering unit 205 may adjust time scales of the wireless quality change patterns. For example, the clustering unit 205 may use a method enabling a degree of similarity between two time-series data to be evaluated in consideration of a difference (expansion and contraction) in the temporal axis direction therebetween, or more specifically, a dynamic time warping (DTW) method and the like.

For example, an environment is assumed where, when a wireless terminal moves along an identical route at an identical speed, an identical wireless quality change pattern is obtained. In such an environment, when two wireless terminals move along the route at different movement speeds, different wireless quality change patterns are likely to be achieved. Use of the dynamic time warping method enables influence of expansion and contraction of two wireless quality change patterns caused by a difference in the movement speed of the wireless terminals to be compensated and evaluation to be performed assuming the two wireless quality change patterns to have a high degree of similarity.

For the method for adjusting time scales of wireless quality change patterns, another method may be used. Specifically, out of a wireless quality change pattern, a period of time (standing-still period) during which a wireless terminal performs measurement while standing still is extracted, and time-series data during the standing-still period in the wireless quality change pattern is aggregated into a value at a point of time. For example, an average value of the wireless quality change pattern during the standing-still period is calculated and a series of wireless quality measured during the standing-still period is aggregated into the average value at a point of time.

Note that whether or not a wireless terminal is standing still may be estimated from the amount of variation in measured wireless quality. That is, when the amount of variation (for example, standard deviation) in the measured wireless quality during a period of time is less than or equal to a predetermined threshold value, the wireless terminal is estimated to have stood still during the period of time.

The clustering unit 205, after step S152, aggregates a plurality of wireless quality change patterns belonging to an identical classification (group) into a wireless quality change pattern (S153).

The clustering unit 205 may, using arbitrary statistical processing, aggregate a plurality of wireless quality change patterns belonging to an identical classification (group) into a wireless quality change pattern. Specifically, by, targeting wireless quality values at corresponding times between wireless quality change patterns, calculating a statistic of wireless quality at each of the corresponding times, the clustering unit 205 aggregates a plurality of wireless quality change patterns belonging to an identical classification (group) into a wireless quality change pattern. Note that the statistic in the calculation is, for example, an average value, a median value, a most frequent value, or the like.

As described above, in the wireless quality prediction device 30 according to the present example embodiment, the clustering unit 205 classifies wireless quality change patterns retained by the wireless quality change pattern construction unit 202 and aggregates wireless quality change patterns belonging to an identical classification into a wireless quality change pattern. The classification and aggregation enable the number of wireless quality change patterns retained by the wireless quality change pattern construction unit 202 to be reduced and prediction processing of wireless quality performed by a wireless quality prediction unit 203 to be made more efficient.

The wireless quality prediction device 30 of the third example embodiment may also be configured with the hardware illustrated in FIG. 3. In this case, the configuration includes a wireless quality prediction program that makes a computer function as respective function means.

Figure 19:
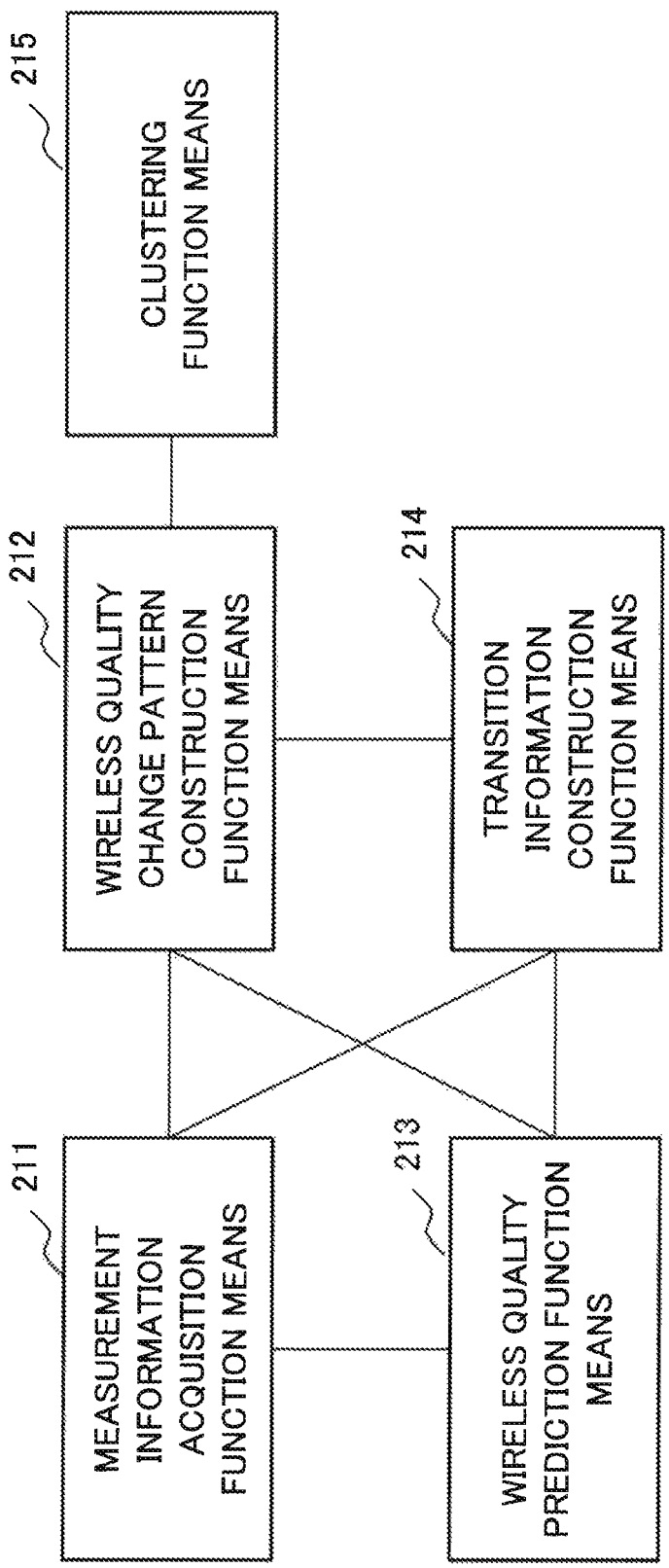
FIG. 19 is a block diagram exemplifying a configuration of function means that a wireless quality prediction program according to the third example embodiment of the present invention achieves.

FIG. 19 is a block diagram exemplifying a configuration of function means that the wireless quality prediction program according to the third example embodiment of the present invention achieves.

The wireless quality prediction program according to the third example embodiment includes, in addition to a measurement information acquisition function means 211, a wireless quality change pattern construction function means 212, a transition information construction function means 214, and a wireless quality prediction function means 213, a clustering function means 215. Functions that the respective function means described above achieve correspond to the measurement information acquisition unit 201, the wireless quality change pattern construction unit 202, a transition information construction unit 204, the wireless quality prediction unit 203, and the clustering unit 205, respectively.

Fourth Example Embodiment

A fourth example embodiment will be described in detail with reference to FIGS. 20 to 22.

Note that a wireless quality prediction device according to the fourth example embodiment is also applied to the wireless communication system 100 exemplified in FIG. 8.

[Description of Configuration]

Figure 20:
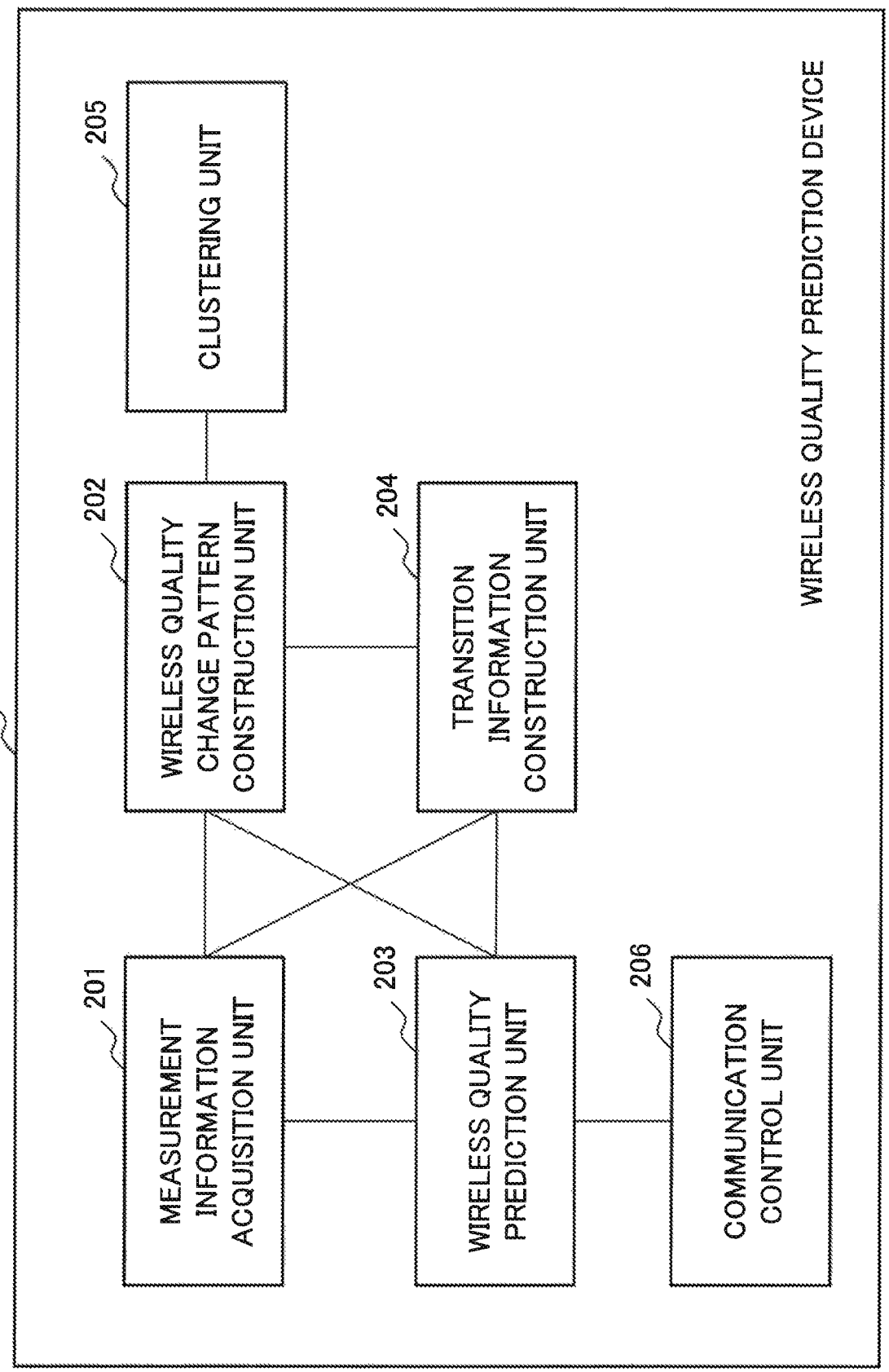
FIG. 20 is a block diagram exemplifying a configuration of a wireless quality prediction device according to a fourth example embodiment of the present invention.

FIG. 20 is a block diagram illustrating a configuration example of the wireless quality prediction device according to the present example embodiment. A wireless quality prediction device 40 according to the present example embodiment differs from the wireless quality prediction device 30 according to the third example embodiment in including a communication control unit 206. Note that a clustering unit 205 does not always have to be included in the wireless quality prediction device 40 according to the present example embodiment and the wireless quality prediction device 40 may be embodied in such a manner that the communication control unit 206 is added to the configuration of the wireless quality prediction device 20 according to the second example embodiment, illustrated in FIG. 7.

The communication control unit 206 performs communication control, based on a result of prediction, performed by a wireless quality prediction unit 203, of a change in wireless quality or a wireless cell to which a wireless terminal belongs. Specifically, with regard to a wireless terminal 23 for which a deterioration or an improvement in wireless quality was predicted by the wireless quality prediction unit 203, the communication control unit 206 controls the transmission amount of packet data to be transmitted to the wireless terminal 23 or the transmission amount of packet data transmitted from the wireless terminal 23.

Note that, when the communication control unit 206 performs such communication control, it is preferable to achieve the wireless quality prediction device 40 as a device on a communication path through which packet data from the wireless terminal 23 or packet data to the wireless terminal 23 pass.

As an example, with regard to a wireless terminal 23 for which a deterioration in wireless quality is predicted by the wireless quality prediction unit 203, the communication control unit 206 decreases the transmission amount of packet data to be transmitted to the wireless terminal 23. Such control enables packet data addressed to the wireless terminal 23 to be prevented from overflowing a temporary storage area (buffer) (buffer overflow) in a wireless base station 22.

As another example, with regard to a wireless terminal 23 for which an improvement in wireless quality is predicted by the wireless quality prediction unit 203, the communication control unit 206 increases the transmission amount of packet data to be transmitted to the wireless terminal 23. Such control enables a situation where no packet data that are addressed to and to be transmitted to the wireless terminal 23 is present in the temporary storage area (buffer) (buffer starvation) to be prevented from occurring in the wireless base station 22.

Note that the communication control unit 206 may instruct another device to perform communication control instead of the communication control unit 206 itself performing communication control. For example, the communication control unit 206 may instruct the wireless base station 22 to perform communication control. The communication control unit 206 may also instruct a server device that is a communication partner of a wireless terminal 23 to perform communication control. In addition, the communication control unit 206 may instruct an arbitrary relay device on a communication path from a wireless terminal 23, for example, a Packet Data Network Gateway (P-GW) residing in an upper level network, to perform communication control.

[Description of Operation]

A specific example of wireless quality prediction processing performed by the wireless quality prediction device 40 according to the present example embodiment will be described.

A feature that the wireless quality prediction processing according to the present example embodiment includes model construction processing and prediction processing and processing details in the processing are the same as those in the wireless quality prediction processing according to the second example embodiment and the third example embodiment.

The wireless quality prediction processing according to the present example embodiment differs from the wireless quality prediction processing according to the second example embodiment and the third example embodiment in that, after the prediction processing has been performed, communication control processing is performed by the communication control unit 206.

Using FIG. 21, the wireless quality prediction processing according to the present example embodiment will be described.

Figure 21:
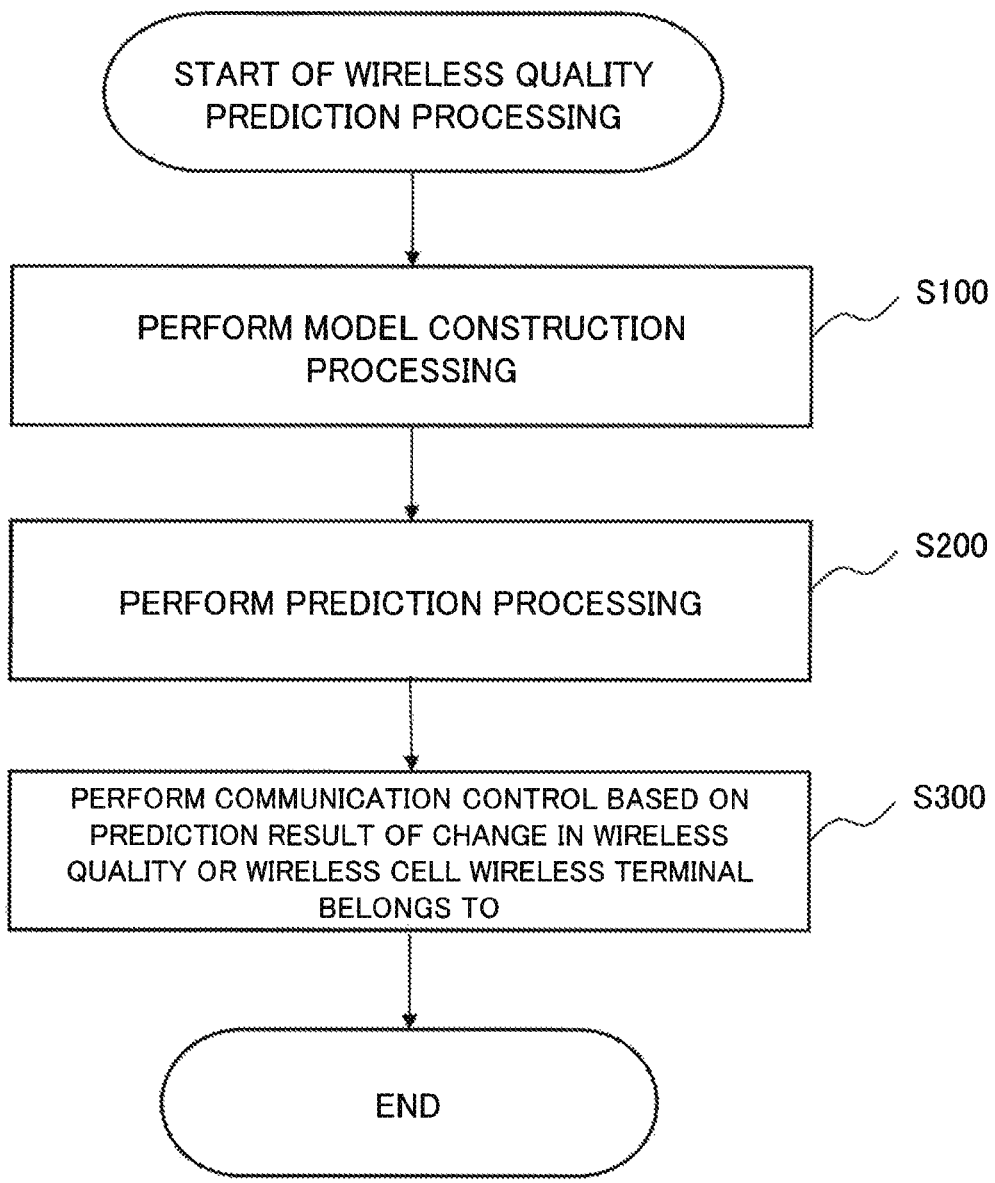
FIG. 21 is a flow diagram exemplifying wireless quality prediction processing in a wireless quality prediction method according to the fourth example embodiment of the present invention.

FIG. 21 is a flow diagram exemplifying the wireless quality prediction processing in a wireless quality prediction method according to the fourth example embodiment of the present invention.

The wireless quality prediction processing according to the present example embodiment includes the model construction processing (S100), the prediction processing (S200), and the communication control processing (S300). Since, as described afore, the model construction processing (S100) and the prediction processing (S200) are the same as those in the second example embodiment and the third example embodiment, a description thereof will be omitted.

The communication control processing in step S300 is performed by the communication control unit 206.

A specific example of the communication control processing performed by the communication control unit 206 will be described.

After the prediction processing in step S200 performed by the wireless quality prediction unit 203 has been finished, the communication control unit 206 starts the communication control processing in step S300.

In step S300, the communication control unit 206 performs communication control, based on a result of prediction, performed by the wireless quality prediction unit 203, of a change in wireless quality or a wireless cell to which a wireless terminal belongs. Specifically, as described above, with regard to a wireless terminal 23 for which a deterioration or an improvement in wireless quality was predicted by the wireless quality prediction unit 203, the communication control unit 206 controls the transmission amount of packet data to be transmitted to the wireless terminal 23 or the transmission amount of packet data transmitted from the wireless terminal 23.

As described above, in the wireless quality prediction device 40 according to the present example embodiment, the communication control unit 206 performs communication control, based on a result of prediction, performed by the wireless quality prediction unit 203, of a change in wireless quality or a wireless cell to which a wireless terminal belongs. For this reason, an issue in wireless quality caused by a rapid improvement or deterioration in wireless quality may be prevented from occurring.

The wireless quality prediction device 40 of the fourth example embodiment may also be configured with the hardware illustrated in FIG. 3. In this case, the configuration includes a wireless quality prediction program that makes a computer function as respective function means.

Figure 22:
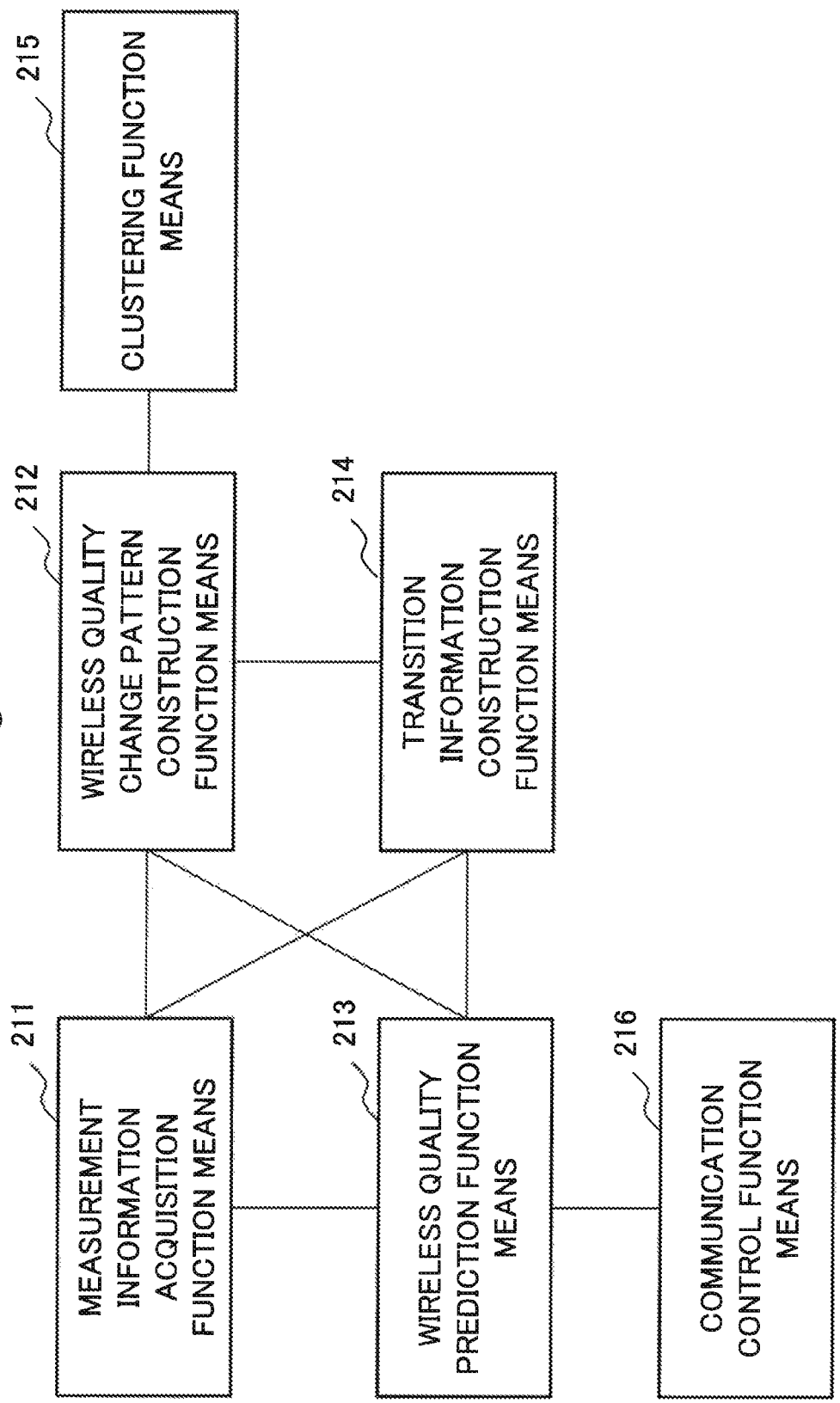
FIG. 22 is a block diagram exemplifying a configuration of function means that a wireless quality prediction program according to the fourth example embodiment of the present invention achieves.

FIG. 22 is a block diagram exemplifying a configuration of function means that the wireless quality prediction program according to the fourth example embodiment of the present invention achieves.

The wireless quality prediction program according to the fourth example embodiment includes, in addition to the configuration of the function means that the wireless quality prediction program according to the third example embodiment, having been described with reference to FIG. 19, achieves, a communication control function means 216. A function that the communication control function means 216 achieves is equivalent to the communication control unit 206.

Note that the wireless quality prediction program according to the present example embodiment may have a configuration including, in addition to the configuration of the function means that the wireless quality prediction program according to the second example embodiment, having been described with reference to FIG. 16, achieves, the communication control function means 216.

Fifth Example Embodiment

A fifth example embodiment will be described in detail with reference to FIGS. 23 and 24.

The present example embodiment is embodied in a configuration in which a wireless quality prediction device is included in a wireless base station.

Figure 23:
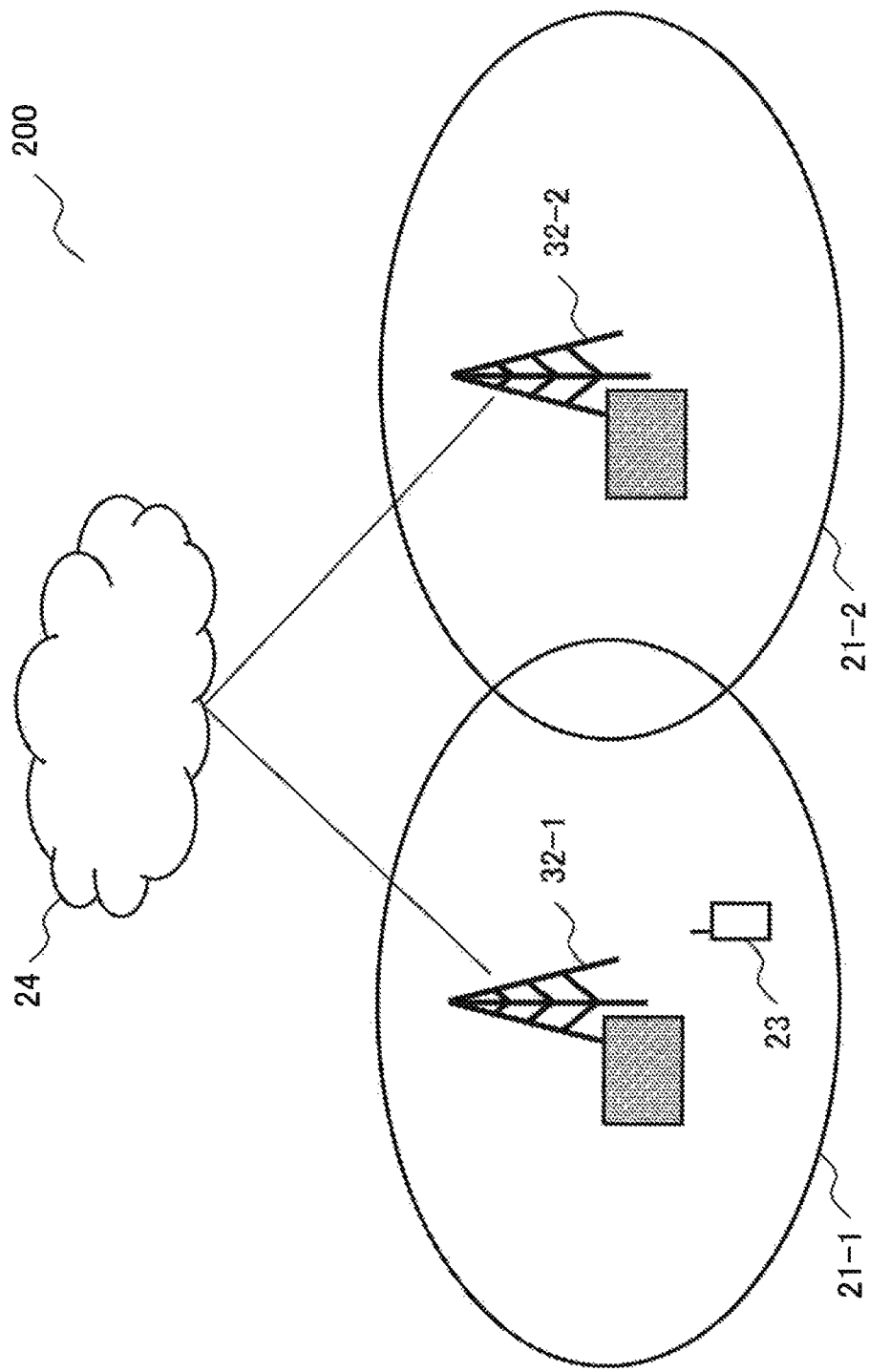
FIG. 23 is a diagram exemplifying a configuration of a wireless communication system when a wireless quality prediction device is included in a wireless base station as a fifth example embodiment of the present invention.

FIG. 23 is a diagram exemplifying a configuration of a wireless communication system when a wireless quality prediction device is included in a wireless base station as the fifth example embodiment. A wireless communication system 200 when a wireless quality prediction device is included in a wireless base station as the present example embodiment has a configuration in which a wireless base station 32 includes a wireless quality prediction device according to any example embodiment of the first to fourth example embodiments.

[Description of Configuration]

Figure 24:
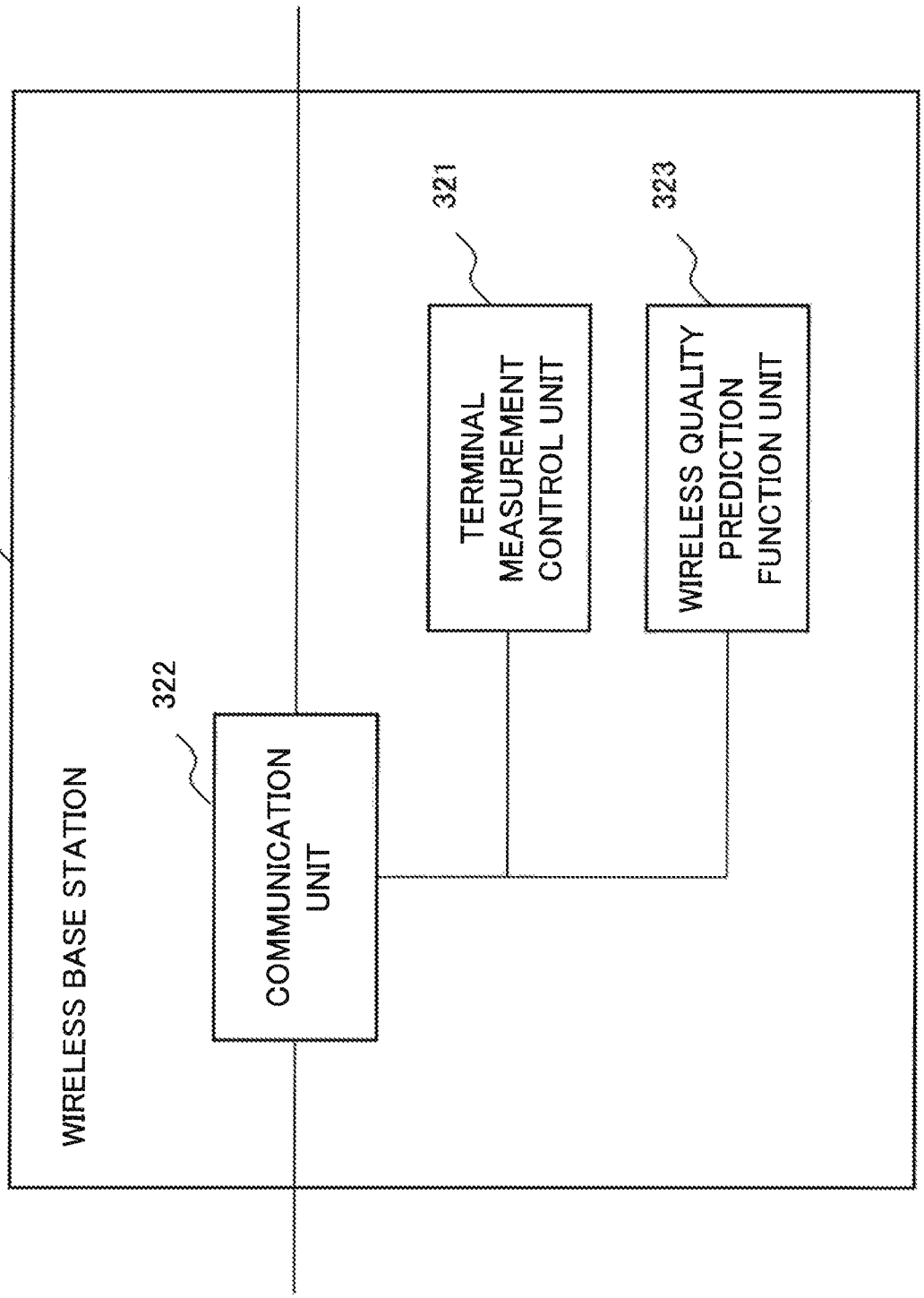
FIG. 24 is a block diagram exemplifying a configuration of the wireless base station including the wireless quality prediction device as the fifth example embodiment of the present invention.

FIG. 24 is a block diagram exemplifying a configuration of the wireless base station 32 including a wireless quality prediction device as the fifth example embodiment.

The wireless base station 32 has a configuration including a communication unit 322, a terminal measurement control unit 321, and a wireless quality prediction function unit 323 and differs from the wireless base station 22 in the wireless communication system 100, having been described with reference to FIG. 8, in including the wireless quality prediction function unit 323. The wireless quality prediction function unit 323 has the same function as that of the wireless quality prediction device according to any example embodiment of the first to fourth example embodiments.

The wireless base station 32 also differs from the wireless base station 22 in the wireless communication system 100 in that the communication unit 322 has a function of exchanging information between wireless base stations.

Note that the terminal measurement control unit 321 has the same function as that of the terminal measurement control unit 221 in the wireless base station 22, having been described with reference to FIG. 9.

The communication unit 322 has a function of transmitting and receiving measurement information of wireless quality that was measured by a wireless terminal 23 and that was acquired by the terminal measurement control unit 321 with another wireless base station 32. The transmission and reception of information between wireless base stations 32 may be performed via a communication line interconnecting the wireless base stations 32 directly or via an upper level network 24. Note that it is preferable to transmit measurement information of wireless quality acquired from a wireless terminal 23 to a wireless base station to which the wireless terminal 23 is to move. It is also preferable to include, in addition to measurement information of wireless quality, identification information of a wireless cell to which the wireless terminal 23 has belonged and the wireless terminal 23 in information to be transmitted.

[Description of Operation]

Wireless quality prediction processing according to the present example embodiment is performed by the wireless quality prediction function unit 323 in the wireless base station 32. Since a specific operation of the wireless quality prediction function unit 323 is the same as that of the wireless quality prediction processing according to any example embodiment of the first to fourth example embodiments, a description thereof will be omitted.

As described above, in the present example embodiment, the wireless quality prediction function unit 323 included in the wireless base station 32 performs the wireless quality prediction processing. For this reason, it is not required to add a dedicated device for performing the wireless quality prediction processing within the wireless communication system 200, which enables the wireless base station 32, which is an existing device, to be utilized.

Note that the wireless base station 32 may be configured to include a recording medium storing a wireless quality prediction program according to any example embodiment of the first to fourth example embodiments and, by means of the wireless quality prediction program, make a computer function as respective function means.

Sixth Example Embodiment

A sixth example embodiment will be described in detail with reference to FIGS. 25 and 26.

The present example embodiment is embodied in a configuration in which a wireless quality prediction device is included in a wireless terminal.

Figure 25:
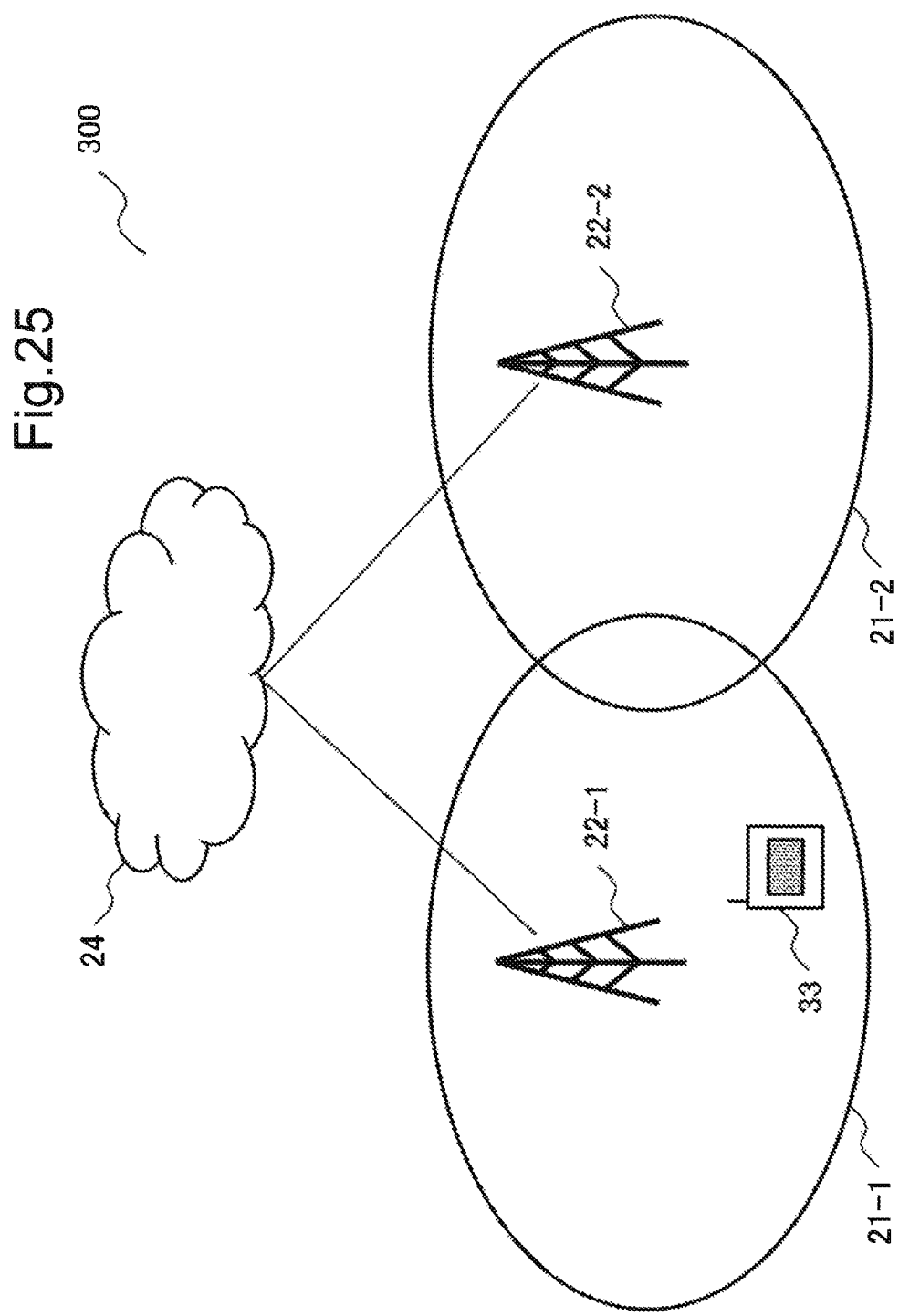
FIG. 25 is a diagram exemplifying a configuration of a wireless communication system in which a wireless quality prediction device is applied to a wireless terminal as a sixth example embodiment of the present invention.

FIG. 25 is a diagram exemplifying a configuration of a wireless communication system when a wireless quality prediction device is included in a wireless terminal as the sixth example embodiment. A wireless communication system 300 when a wireless quality prediction device is included in a wireless terminal as the present example embodiment has a configuration in which a wireless terminal 33 includes a wireless quality prediction device according to any example embodiment of the first to fourth example embodiments. Note that, in the present example embodiment, a wireless base station 22 in the wireless communication system 300 has the same configuration as that (see FIG. 9) of the wireless base station 22 in the wireless communication system 100, having been described with reference to FIG. 8.

[Description of Configuration]

Figure 26:
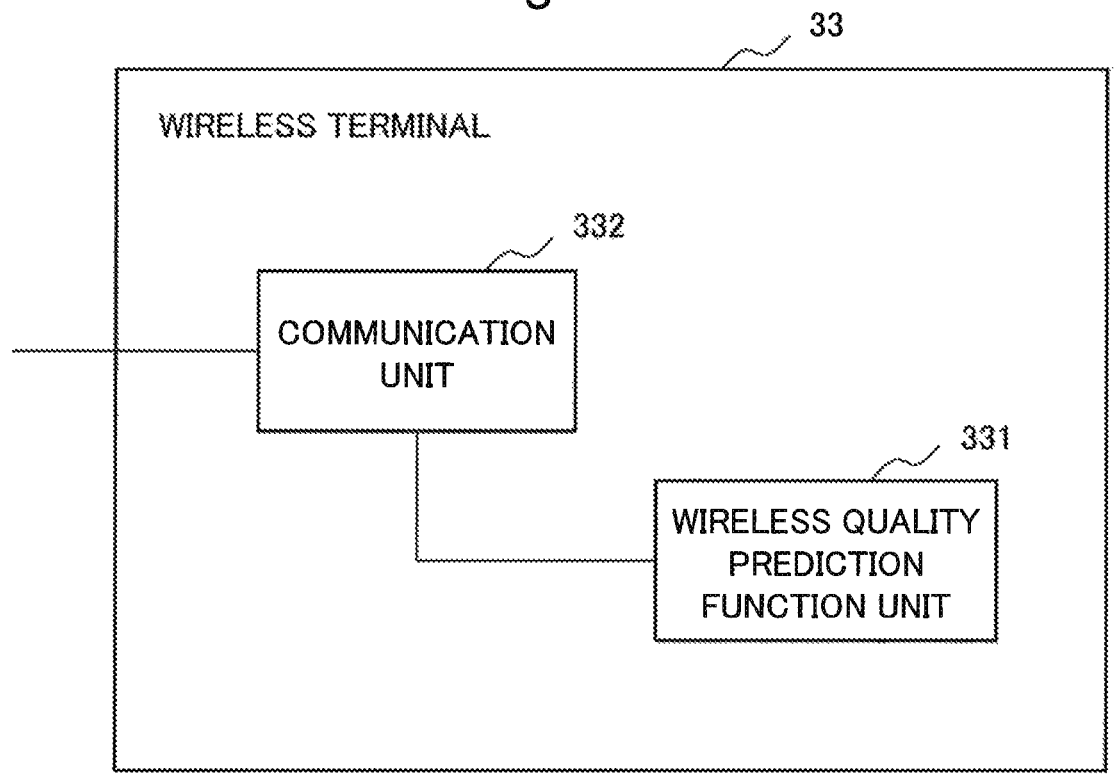
FIG. 26 is a block diagram exemplifying a configuration of the wireless terminal including the wireless quality prediction device as the sixth example embodiment of the present invention.

FIG. 26 is a block diagram exemplifying a configuration of a wireless terminal including a wireless quality prediction device as the sixth example embodiment. A wireless terminal 33 has a configuration including a communication unit 332 and a wireless quality prediction function unit 331 and differs from the wireless terminal 23 in the wireless communication system 100, having been described with reference to FIG. 8, in including the wireless quality prediction function unit 331. The wireless quality prediction function unit 331 has the same function as that of the wireless quality prediction device according to any example embodiment of the first to fourth example embodiments.

The communication unit 332 provides basic functions for establishing a wireless link between the wireless terminal 33 and a wireless base station 22 and performing wireless communication. The basic functions in the present example embodiment include, for example, a wireless interface function with the wireless base station 22, a modulation/demodulation function of a wireless signal, and the like. Since the basic functions are well known for those skilled in the art, a detailed description thereof will be omitted.

Functions of the wireless quality prediction function unit 331 may be achieved in any mode of a built-in device in the wireless terminal 33, a peripheral device of the wireless terminal 33, and software operating in the wireless terminal 33. When being achieved as software, the functions may be achieved as a fundamental software (an Operating System) of the wireless terminal 33, an application operating on the fundamental software, or the like. When the functions are achieved as software, the wireless terminal 33 includes a recording medium storing a wireless quality prediction program according to any example embodiment of the first to fourth example embodiments.

[Description of Operation]

Wireless quality prediction processing according to the present example embodiment is performed by the wireless quality prediction function unit 331 in the wireless terminal 33.

In the case of the present example embodiment, the wireless terminal 33, using wireless quality measured by the wireless terminal 33 itself, performs model construction processing and prediction processing. The model construction processing may be performed constantly or periodically (for example, during a specific week in every month). The prediction processing may be performed periodically or in an event triggered manner. As triggering events, events such as start of a communication, an occurrence of a handover event, completion of a handover, an operation by a user, turning on of a wireless terminal screen, and the like may be used.

Since a specific operation of the wireless quality prediction function unit 331 is the same as that of the wireless quality prediction processing according to any example embodiment of the first to fourth example embodiments, a description thereof will be omitted.

As described above, the wireless quality prediction function unit 331 included in the wireless terminal 33 according to the present example embodiment performs the wireless quality prediction processing. For this reason, it is not required to add a dedicated device for performing the wireless quality prediction processing, which enables the wireless terminal 33, which is an existing device, to be utilized. Further, since a device measuring wireless quality is identical to a device performing the wireless quality prediction processing, it is not required to transmit measurement information of wireless quality for performing the wireless quality prediction processing to another communication device, which enables a communication load on a wireless terminal to be reduced.

The whole or part of the example embodiments disclosed above can be described as, but not limited to, the following supplementary notes.

(Supplementary Note 1) A wireless quality prediction device, including:

a measurement information acquisition means for acquiring measurement information of wireless quality measured by a wireless terminal that moves within a wireless communication system having two or more wireless cells;

a wireless quality change pattern construction means for, by use of the measurement information of wireless quality, constructing, as a wireless quality change pattern, a time-series data pattern of wireless quality associated with passage of time; and a wireless quality prediction means for, with respect to measurement information of wireless quality acquired from a prediction target wireless terminal, acquiring the wireless quality change pattern having a high degree of similarity to the measurement information from the wireless quality change pattern construction means and, by use of the acquired wireless quality change pattern, predicting future wireless quality of the prediction target wireless terminal or a future change in a wireless cell to which the prediction target wireless terminal belongs.

(Supplementary Note 2) The wireless quality prediction device according to supplementary note 1, wherein
the wireless quality change pattern is information associated with a wireless cell and information indicating a change in wireless quality measured by an identical wireless terminal while the wireless terminal belongs to the wireless cell, and
the wireless quality change pattern construction means, targeting one or more wireless terminal and two or more wireless cells, constructs the wireless quality change pattern.

(Supplementary Note 3) The wireless quality prediction device according to supplementary note 2, further including
a transition information construction means for constructing, as transition information, information indicating transition relationships between the two or more wireless quality change patterns measured by an identical wireless terminal, wherein
the wireless quality prediction means, with respect to measurement information of wireless quality acquired from the prediction target wireless terminal, by use of the wireless quality change pattern having a high degree of similarity to the measurement information and the transition information, predicts future wireless quality of the prediction target wireless terminal or a wireless cell to which the prediction target wireless terminal is to belong in future.

(Supplementary Note 4) The wireless quality prediction device according to supplementary note 3, wherein
the wireless quality prediction means, with respect to the prediction target wireless terminal, by use of time length data retained by the wireless quality change pattern having a high degree of similarity to measurement information of wireless quality acquired from the prediction target wireless terminal, predicts a timing at which a wireless cell to which the prediction target wireless terminal belongs changes.

(Supplementary Note 5) The wireless quality prediction device according to supplementary note 3, wherein
the transition information construction means, with respect to transition relationships between the two or more wireless quality change patterns measured by the identical wireless terminal, constructs and retains, as the transition information, the numbers of times or probabilities that arbitrary two wireless quality change patterns are temporally continuously measured.

(Supplementary Note 6) The wireless quality prediction device according to supplementary note 5, wherein
the wireless quality prediction means, by use of the transition information retained by the transition information construction means, acquires the wireless quality change pattern having a high probability of being temporally continuously measured with the wireless quality change pattern having a high degree of similarity to measurement information of wireless quality acquired from the prediction target wireless terminal and predicts a wireless cell associated with the wireless quality change pattern having a high probability of being temporally continuously measured as a wireless cell to which the prediction target wireless terminal is to belong in future.

(Supplementary Note 7) The wireless quality prediction device according to supplementary note 5, wherein
the wireless quality prediction means, by use of the wireless quality change pattern having a high probability of being temporally continuously measured with the wireless quality change pattern having a high degree of similarity to measurement information of wireless quality acquired from the prediction target wireless terminal, predicts wireless quality in a wireless cell to which the prediction target wireless terminal is to belong in future.

(Supplementary Note 8) The wireless quality prediction device according to any supplementary note of supplementary notes 2 to 7, further including
a clustering means for extracting, out of a plurality of the wireless quality change patterns, a plurality of wireless quality change patterns the wireless cells associated with which are identical, calculating a degree(s) of similarity between the wireless quality change patterns the wireless cells associated with which are identical and, based on the calculated degree(s) of similarity, classifying the wireless quality change patterns the wireless cells associated with which are identical into a group(s).

(Supplementary Note 9) The wireless quality prediction device according to supplementary note 8, wherein
the clustering means, upon calculation of a degree(s) of similarity between the wireless quality change patterns the wireless cells associated with which are identical, calculates the degree(s) of similarity by adjusting time scales with respect to two wireless quality change patterns serving as comparison targets.

(Supplementary Note 10) The wireless quality prediction device according to supplementary note 8 or 9, wherein
the clustering means, targeting wireless quality values at corresponding times between the wireless quality change patterns the wireless cells associated with which are identical that are classified into an identical group, calculates a statistic of wireless quality for each of the corresponding times and aggregates the plurality of wireless quality change patterns belonging to an identical group into a wireless quality change pattern.

(Supplementary Note 11) The wireless quality prediction device according to any supplementary note of supplementary notes 1 to 10, wherein
the wireless quality prediction means, in the calculation of the degree of similarity between measurement information of wireless quality acquired from the prediction target wireless terminal and the wireless quality change pattern, calculates the degree of similarity by adjusting time scales.

(Supplementary Note 12) The wireless quality prediction device according to any supplementary note of supplementary notes 1 to 11, further including
a communication control means for, by use of future wireless quality of the prediction target wireless terminal or a future change in a wireless cell to which the prediction target wireless terminal belongs that are predicted by the wireless quality prediction means, controlling communication related to the prediction target wireless terminal.

(Supplementary Note 13) A wireless quality prediction method including:
acquiring measurement information of wireless quality measured by a wireless terminal that moves within a wireless communication system having two or more wireless cells;
by use of the measurement information of wireless quality, constructing, as a wireless quality change pattern, a time-series data pattern of wireless quality associated with passage of time;

with respect to measurement information of wireless quality acquired from a prediction target wireless terminal, acquiring the wireless quality change pattern having a high degree of similarity to the measurement information; and by use of the acquired wireless quality change pattern, predicting future wireless quality of the prediction target wireless terminal or a future change in a wireless cell to which the prediction target wireless terminal belongs.

(Supplementary Note 14) The wireless quality prediction method according to supplementary note 13, wherein the wireless quality change pattern is information associated with a wireless cell and information indicating a change in wireless quality measured by an identical wireless terminal while the wireless terminal belongs to the wireless cell and includes a wireless quality change pattern constructed targeting one or more wireless terminal and two or more wireless cells.

(Supplementary Note 15) The wireless quality prediction method according to supplementary note 14 including:

constructing, as transition information, information indicating transition relationships between the two or more the wireless quality change patterns measured by an identical wireless terminal, and with respect to measurement information of wireless quality acquired from the prediction target wireless terminal, by use of the wireless quality change pattern having a high degree of similarity to the measurement information and the transition information, predicting future wireless quality of the prediction target wireless terminal or a wireless cell to which the prediction target wireless terminal is to belong in future.

(Supplementary Note 16) The wireless quality prediction method according to supplementary note 15 including with respect to the prediction target wireless terminal, by use of time length data retained by the wireless quality change pattern having a high degree of similarity to measurement information of wireless quality acquired from the prediction target wireless terminal, predicting a timing at which a wireless cell to which the prediction target wireless terminal belongs changes.

(Supplementary Note 17) The wireless quality prediction method according to supplementary note 15 including with respect to transition relationships between the two or more wireless quality change patterns measured by the identical wireless terminal, constructing and retaining, as the transition information, the numbers of times or probabilities that arbitrary two wireless quality change patterns are temporally continuously measured.

(Supplementary Note 18) The wireless quality prediction method according to supplementary note 17 including by use of the transition information, acquiring the wireless quality change pattern having a high probability of being temporally continuously measured with the wireless quality change pattern having a high degree of similarity to measurement information of wireless quality acquired from the prediction target wireless terminal and predicting a wireless cell associated with the wireless quality change pattern having a high probability of being temporally continuously measured as a wireless cell to which the prediction target wireless terminal is to belong in future.

(Supplementary Note 19) The wireless quality prediction method according to supplementary note 17 including by use of the wireless quality change pattern having a high probability of being temporally continuously measured with the wireless quality change pattern having a high degree of similarity to measurement information of wireless quality acquired from the prediction target wireless terminal, predicting wireless quality in a wireless cell to which the prediction target wireless terminal is to belong in future.

(Supplementary Note 20) The wireless quality prediction method according to any supplementary note of supplementary notes 14 to 19 including:

extracting, out of a plurality of the wireless quality change patterns, a plurality of wireless quality change patterns the wireless cells associated with which are identical;

calculating a degree(s) of similarity between the wireless quality change patterns the wireless cells associated with which are identical; and based on the calculated degree(s) of similarity, classifying the wireless quality change patterns the wireless cells associated with which are identical into a group(s).

(Supplementary Note 21) The wireless quality prediction method according to supplementary note 20 including upon calculation of a degree(s) of similarity between the wireless quality change patterns the wireless cells associated with which are identical, calculating the degree(s) of similarity by adjusting time scales with respect to two wireless quality change patterns serving as comparison targets.

(Supplementary Note 22) The wireless quality prediction method according to supplementary note 20 or 21 including targeting wireless quality values at corresponding times between the wireless quality change patterns the wireless cells associated with which are identical that are classified into an identical group, calculating a statistic of wireless quality for each of the corresponding times and aggregating the plurality of wireless quality change patterns belonging to an identical group into a wireless quality change pattern.

(Supplementary Note 23) The wireless quality prediction method according to any supplementary note of supplementary notes 13 to 22 including in the calculation of the degree of similarity between measurement information of wireless quality acquired from the prediction target wireless terminal and the wireless quality change pattern, calculating the degree of similarity by adjusting time scales.

(Supplementary Note 24) The wireless quality prediction method according to any supplementary note of supplementary notes 13 to 23 including by use of future wireless quality of the prediction target wireless terminal or a future change in a wireless cell to which the prediction target wireless terminal belongs, controlling communication related to the prediction target wireless terminal.

(Supplementary Note 25) A wireless quality prediction program making a computer function as:

a measurement information acquisition function means for acquiring measurement information of wireless quality measured by a wireless terminal that moves within a wireless communication system having two or more wireless cells;

a wireless quality change pattern construction function means for, by use the measurement information of wireless quality, constructing, as a wireless quality change pattern, a time-series data pattern of wireless quality associated with passage of time; and a wireless quality prediction function means for, with respect to measurement information of wireless quality acquired from a prediction target wireless terminal, acquiring the wireless quality change pattern having a high degree of similarity to the measurement information from the wireless quality change pattern construction function means and, by use of the acquired wireless quality change pattern, predicting future wireless quality of the prediction target wireless terminal or a future change in a wireless cell to which the prediction target wireless terminal belongs.

(Supplementary Note 26) The wireless quality prediction program according to supplementary note 25, wherein
the wireless quality change pattern is information associated with a wireless cell and information indicating a change in wireless quality measured by an identical wireless terminal while the wireless terminal belongs to the wireless cell, and
the wireless quality change pattern construction function means, targeting one or more wireless terminal and two or more wireless cells, constructs the wireless quality change pattern.

(Supplementary Note 27) The wireless quality prediction program according to supplementary note 26 further making the computer function as
a transition information construction means for constructing, as transition information, information indicating transition relationships between the two or more the wireless quality change patterns measured by an identical wireless terminal, wherein
the wireless quality prediction function means, with respect to measurement information of wireless quality acquired from the prediction target wireless terminal, by use of the wireless quality change pattern having a high degree of similarity to the measurement information and the transition information, predicts future wireless quality of the prediction target wireless terminal or a wireless cell to which the prediction target wireless terminal is to belong in future.

(Supplementary Note 28) The wireless quality prediction program according to supplementary note 27, wherein
the wireless quality prediction function means, with respect to the prediction target wireless terminal, by use of time length data retained by the wireless quality change pattern having a high degree of similarity to measurement information of wireless quality acquired from the prediction target wireless terminal, predicts a timing at which a wireless cell to which the prediction target wireless terminal belongs changes.

(Supplementary Note 29) The wireless quality prediction program according to supplementary note 27, wherein
the transition information construction function means, with respect to transition relationships between the two or more wireless quality change patterns measured by the identical wireless terminal, constructs and retains, as the transition information, the numbers of times or probabilities that arbitrary two wireless quality change patterns are temporally continuously measured.

(Supplementary Note 30) The wireless quality prediction program according to supplementary note 29, wherein
the wireless quality prediction function means, by use of the transition information retained by the transition information construction function means, acquires the wireless quality change pattern having a high probability of being temporally continuously measured with the wireless quality change pattern having a high degree of similarity to measurement information of wireless quality acquired from the prediction target wireless terminal and predicts a wireless cell associated with the wireless quality change pattern having a high probability of being temporally continuously measured as a wireless cell to which the prediction target wireless terminal is to belong in future.

(Supplementary Note 31) The wireless quality prediction program according to supplementary note 29, wherein
the wireless quality prediction function means, by use of the wireless quality change pattern having a high probability of being temporally continuously measured with the wireless quality change pattern having a high degree of similarity to measurement information of wireless quality acquired from the prediction target wireless terminal, predicts wireless quality in a wireless cell to which the prediction target wireless terminal is to belong in future.

(Supplementary Note 32) The wireless quality prediction program according to any supplementary note of supplementary notes 26 to 31 further making the computer function as
a clustering function means for extracting, out of a plurality of the wireless quality change patterns, a plurality of wireless quality change patterns the wireless cells associated with which are identical, calculating a degree(s) of similarity between the wireless quality change patterns the wireless cells associated with which are identical and, based on the calculated degree(s) of similarity, classifying wireless quality change patterns the wireless cells associated with which are identical into a group(s).

(Supplementary Note 33) The wireless quality prediction program according to supplementary note 32, wherein
the clustering function means, upon calculation of a degree(s) of similarity between the wireless quality change patterns the wireless cells associated with which are identical, calculates the degree(s) of similarity by adjusting time scales with respect to two wireless quality change patterns serving as comparison targets.

(Supplementary Note 34) The wireless quality prediction program according to supplementary note 32 or 33, wherein
the clustering function means, targeting wireless quality values at corresponding times between the wireless quality change patterns the wireless cells associated with which are identical that are classified into an identical group, calculates a statistic of wireless quality for each of the corresponding times and aggregates the plurality of wireless quality change patterns belonging to an identical group into a wireless quality change pattern.

(Supplementary Note 35) The wireless quality prediction program according to any supplementary note of supplementary notes 25 to 34, wherein
the wireless quality prediction function means, in the calculation of the degree of similarity between measurement information of wireless quality acquired from the prediction target wireless terminal and the wireless quality change pattern, calculates the degree of similarity by adjusting time scales.

(Supplementary Note 36) The wireless quality prediction program according to any supplementary note of supplementary notes 25 to 35 further making the computer function as
a communication control function means for, by use of future wireless quality of the prediction target wireless terminal or a future change in a wireless cell to which the prediction target wireless terminal belongs that are predicted by the wireless quality prediction function means, controlling communication related to the prediction target wireless terminal.

(Supplementary Note 37) A wireless base station including:
a wireless quality prediction device according to any supplementary note of supplementary notes 1 to 12; and
a terminal measurement control means for instructing a wireless terminal to measure and report wireless quality, acquiring measurement information of wireless quality measured by the wireless terminal, and outputting the measurement information of wireless quality to the wireless quality prediction device.

(Supplementary Note 38) A wireless base station according to supplementary note 37 further including
a communication unit that transmits the measurement information of wireless quality that is measured by the wireless terminal and that is acquired by the terminal measurement control means to another wireless base station.

(Supplementary Note 39) A wireless base station including
a recording medium storing:
a wireless quality prediction program according to any supplementary note of supplementary notes 25 to 36; and
a terminal measurement control program including a terminal measurement control function means for instructing a wireless terminal to measure and report wireless quality, acquiring measurement information of wireless quality measured by the wireless terminal, and outputting the measurement information of wireless quality.

(Supplementary Note 40) The wireless base station according to supplementary note 39, the recording medium further storing
a communication program including a communication function means for transmitting the measurement information of wireless quality that is measured by the wireless terminal and that is acquired by the terminal measurement control function means to another wireless base station.

(Supplementary Note 41) A wireless terminal including
a wireless quality prediction device according to any supplementary note of supplementary notes 1 to 12.

(Supplementary Note 42) The wireless terminal according to supplementary note 41, wherein
the wireless quality prediction device, by use of measurement information of wireless quality measured by the wireless terminal, constructs the wireless quality change pattern and the transition information and, by use of the measurement information of wireless quality measured during a predetermined target period of time for prediction processing, predicts future wireless quality of the wireless terminal or a future change in a wireless cell to which the wireless terminal belongs.

(Supplementary Note 43) A wireless terminal including a recording medium storing
a wireless quality prediction program according to any supplementary note of supplementary notes 25 to 36.

(Supplementary Note 44) The wireless terminal according to supplementary note 43, wherein
the wireless quality prediction program, by use of measurement information of wireless quality measured by the wireless terminal, constructs the wireless quality change pattern and the transition information and, by use of the measurement information of wireless quality measured during a predetermined target period of time for prediction processing, predicts future wireless quality of the wireless terminal or a future change in a wireless cell to which the wireless terminal belongs.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-017321, filed on Feb. 1, 2016, the disclosure of which is incorporated herein in its entirety by reference.

REFERENCE SIGNS LIST 1, 20, 30, 40 Wireless quality prediction device
2, 22, 32 Wireless base station
3, 23, 33 Wireless terminal
11 Measurement information acquisition means
12 Wireless quality change pattern construction means
13 Wireless quality prediction means
14 Terminal measurement control means
24 Upper level network
100, 200, 300 Wireless communication system
111 CPU
112 Main storage unit
113 Auxiliary storage unit
114 Communication unit
115 Input/output unit
116 System bus
121, 211 Measurement information acquisition function means
122, 212 Wireless quality change pattern construction function means
123, 213 Wireless quality prediction function means
201 Measurement information acquisition unit
202 Wireless quality change pattern construction unit
203 Wireless quality prediction unit
204 Transition information construction unit
205 Clustering unit
206 Communication control unit
214 Transition information construction function means
215 Clustering function means
216 Communication control function means
221, 321 Terminal measurement control unit
222, 322, 332 Communication unit
323, 331 Wireless quality prediction function unit

The invention claimed is:

1. A wireless quality prediction device, comprising:
a processor; and
memory storing executable instructions that, when executed by the processor, causes the processor to perform as:
a measurement information acquisition unit that acquires measurement information of wireless quality measured by a wireless terminal that moves within a wireless communication system having two or more wireless cells;
a wireless quality change pattern construction unit that, by use of the measurement information of wireless quality, constructs, as a wireless quality change pattern, a time-series data pattern of wireless quality associated with passage of time; and
a wireless quality prediction unit that, with respect to measurement information of wireless quality acquired from a prediction target wireless terminal, acquires the wireless quality change pattern having a high degree of similarity to the measurement information from the wireless quality change pattern construction unit and, by use of the acquired wireless quality change pattern, predicts future wireless quality of the prediction target wireless terminal or a future change in a wireless cell to which the prediction target wireless terminal belongs.

2. The wireless quality prediction device according to claim 1, wherein
the wireless quality change pattern is information associated with a wireless cell and information indicating a change in wireless quality measured by an identical wireless terminal while the wireless terminal belongs to the wireless cell, and the wireless quality change pattern construction unit, targeting one or more wireless terminal and two or more wireless cells, constructs the wireless quality change pattern.

3. The wireless quality prediction device according to claim 2, wherein the processor further performs as:

a transition information construction unit that constructs, as transition information, information indicating transition relationships between two or more of the wireless quality change patterns measured by an identical wireless terminal, wherein the wireless quality prediction unit, with respect to measurement information of wireless quality acquired from the prediction target wireless terminal, by use of the wireless quality change pattern having a high degree of similarity to the measurement information and the transition information, predicts future wireless quality of the prediction target wireless terminal or a wireless cell to which the prediction target wireless terminal is to belong in future.

4. The wireless quality prediction device according to claim 3, wherein the wireless quality prediction unit, with respect to the prediction target wireless terminal, by use of time length data retained by the wireless quality change pattern having a high degree of similarity to measurement information of wireless quality acquired from the prediction target wireless terminal, predicts a timing at which a wireless cell to which the prediction target wireless terminal belongs changes.

5. The wireless quality prediction device according to claim 3, wherein the transition information construction unit, with respect to transition relationships between the two or more wireless quality change patterns measured by the identical wireless terminal, constructs and retains, as the transition information, the numbers of times or probabilities that arbitrary two wireless quality change patterns are temporally continuously measured.

6. The wireless quality prediction device according to claim 5, wherein the wireless quality prediction unit, by use of the transition information retained by the transition information construction unit, acquires the wireless quality change pattern having a high probability of being temporally continuously measured with the wireless quality change pattern having a high degree of similarity to measurement information of wireless quality acquired from the prediction target wireless terminal and predicts a wireless cell associated with the wireless quality change pattern having a high probability of being temporally continuously measured as a wireless cell to which the prediction target wireless terminal is to belong in future.

7. The wireless quality prediction device according to claim 5, wherein the wireless quality prediction unit, by use of the wireless quality change pattern having a high probability of being temporally continuously measured with the wireless quality change pattern having a high degree of similarity to measurement information of wireless quality acquired from the prediction target wireless terminal, predicts wireless quality in a wireless cell to which the prediction target wireless terminal is to belong in future.

8. The wireless quality prediction device according to claim 2, wherein the processor further performs as:

a clustering unit that extracts, out of a plurality of the wireless quality change patterns, a plurality of wireless quality change patterns the wireless cells associated with which are identical, calculating a degree(s) of similarity between the wireless quality change patterns the wireless cells associated with which are identical and, based on the calculated degree(s) of similarity, classifying the wireless quality change patterns the wireless cells associated with which are identical into a group(s).

9. The wireless quality prediction device according to claim 8, wherein the clustering unit, upon calculation of a degree(s) of similarity between the wireless quality change patterns the wireless cells associated with which are identical, calculates the degree(s) of similarity by adjusting time scales with respect to two wireless quality change patterns serving as comparison targets.

10. The wireless quality prediction device according to claim 8, wherein the clustering unit, targeting wireless quality values at corresponding times between the wireless quality change patterns the wireless cells associated with which are identical that are classified into an identical group, calculates a statistic of wireless quality for each of the corresponding times and aggregates the plurality of wireless quality change patterns belonging to an identical group into a wireless quality change pattern.

11. The wireless quality prediction device according to claim 1, wherein the wireless quality prediction unit, in the calculation of the degree of similarity between measurement information of wireless quality acquired from the prediction target wireless terminal and the wireless quality change pattern, calculates the degree of similarity by adjusting time scales.

12. The wireless quality prediction device according to claim 1, wherein the processor further performs as:

a communication control unit that, by use of future wireless quality of the prediction target wireless terminal or a future change in a wireless cell to which the prediction target wireless terminal belongs that are predicted by the wireless quality prediction unit, controls communication related to the prediction target wireless terminal.

13. A wireless quality prediction method comprising:

acquiring measurement information of wireless quality measured by a wireless terminal that moves within a wireless communication system having two or more wireless cells;

by use of the measurement information of wireless quality, constructing, as a wireless quality change pattern, a time-series data pattern of wireless quality associated with passage of time;

with respect to measurement information of wireless quality acquired from a prediction target wireless terminal, acquiring the wireless quality change pattern having a high degree of similarity to the measurement information; and by use of the acquired wireless quality change pattern, predicting future wireless quality of the prediction target wireless terminal or a future change in a wireless cell to which the prediction target wireless terminal belongs.

14. The wireless quality prediction method according to claim 13, wherein the wireless quality change pattern is information associated with a wireless cell and information indicating a change in wireless quality measured by an identical wireless terminal while the wireless terminal belongs to the wireless cell and includes a wireless quality change pattern constructed targeting one or more wireless terminal and two or more wireless cells.

15. The wireless quality prediction method according to claim 14 comprising:

constructing, as transition information, information indicating transition relationships between two or more of the wireless quality change patterns measured by an identical wireless terminal, and with respect to measurement information of wireless quality acquired from the prediction target wireless terminal, by use of the wireless quality change pattern having a high degree of similarity to the measurement information and the transition information, predicting future wireless quality of the prediction target wireless terminal or a wireless cell to which the prediction target wireless terminal is to belong in future.

16. The wireless quality prediction method according to claim 15 comprising:

with respect to the prediction target wireless terminal, by use of time length data retained by the wireless quality change pattern having a high degree of similarity to measurement information of wireless quality acquired from the prediction target wireless terminal, predicting a timing at which a wireless cell to which the prediction target wireless terminal belongs changes.

17. The wireless quality prediction method according to claim 15 comprising:

with respect to transition relationships between the two or more wireless quality change patterns measured by the identical wireless terminal, constructing and retaining, as the transition information, the numbers of times or probabilities that arbitrary two wireless quality change patterns are temporally continuously measured.

18. The wireless quality prediction method according to claim 17 comprising:

by use of the transition information, acquiring the wireless quality change pattern having a high probability of being temporally continuously measured with the wireless quality change pattern having a high degree of similarity to measurement information of wireless quality acquired from the prediction target wireless terminal and predicting a wireless cell associated with the wireless quality change pattern having a high probability of being temporally continuously measured as a wireless cell to which the prediction target wireless terminal is to belong in future.

19. A non-transitory computer-readable wireless quality prediction program making a computer function as:

a measurement information acquisition function means for acquiring measurement information of wireless quality measured by a wireless terminal that moves within a wireless communication system having two or more wireless cells;

a wireless quality change pattern construction function means for, by use the measurement information of wireless quality, constructing, as a wireless quality change pattern, a time-series data pattern of wireless quality associated with passage of time; and a wireless quality prediction function means for, with respect to measurement information of wireless quality acquired from a prediction target wireless terminal, acquiring the wireless quality change pattern having a high degree of similarity to the measurement information from the wireless quality change pattern construction function means and, by use of the acquired wireless quality change pattern, predicting future wireless quality of the prediction target wireless terminal or a future change in a wireless cell to which the prediction target wireless terminal belongs.

20. The non-transitory computer-readable wireless quality prediction program according to claim 19, wherein the wireless quality change pattern is information associated with a wireless cell and information indicating a change in wireless quality measured by an identical wireless terminal while the wireless terminal belongs to the wireless cell, and the wireless quality change pattern construction function means, targeting one or more wireless terminal and two or more wireless cells, constructs the wireless quality change pattern.

* * * * *